United States Patent
Kang et al.

(10) Patent No.: US 8,258,958 B2
(45) Date of Patent: Sep. 4, 2012

(54) DUAL ANTENNA RFID TAG

(75) Inventors: Hee Bok Kang, Chungcheongbuk-do (KR); Suk Kyoung Hong, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 536 days.

(21) Appl. No.: 12/494,979

(22) Filed: Jun. 30, 2009

(65) Prior Publication Data
US 2010/0148926 A1 Jun. 17, 2010

(30) Foreign Application Priority Data
Dec. 12, 2008 (KR) .......... 10-2008-0126593

(51) Int. Cl.
*G08B 21/00* (2006.01)

(52) U.S. Cl. .......... 340/572.7; 340/572.1; 340/10.1

(58) Field of Classification Search ......... 340/572.1, 340/572.2, 572.7, 10.1, 10.34, 10.4
See application file for complete search history.

(56) References Cited

U.S. PATENT DOCUMENTS
2005/0248438 A1* 11/2005 Hughes et al. ......... 340/10.4
2010/0148965 A1* 6/2010 Alexis et al. ......... 340/572.1

FOREIGN PATENT DOCUMENTS
KR 2006-0004798 A 1/2006
KR 10-0696776 B1 3/2007

* cited by examiner

*Primary Examiner* — Jeffery Hofsass
(74) *Attorney, Agent, or Firm* — Ladas & Parry LLP

(57) ABSTRACT

A dual antenna RFID tag which can perform both Near Field (NF) communication and Far Field (FF) communication using a single RF tag is presented. The RFID tag includes an antenna unit and a voltage rectification unit. The antenna unit can perform communications in either or both a first and a second bandwidth. The voltage rectification unit can rectify and boost one or more radio signals received through the antenna unit and generate one or more power voltage impulses corresponding to the radio signals respectively.

28 Claims, 26 Drawing Sheets

DUAL ANTENNA RFID TAG

CROSS-REFERENCE TO RELATED APPLICATION

The priority of Korean patent application No. 10-2008-0126593 filed Dec. 12, 2008, the disclosure of which is hereby incorporated in its entirety by reference, is claimed.

BACKGROUND OF THE INVENTION

1. Field of the Invention

The present invention relates to a RFID tag which can be used both for Near Field (NF) Radio Frequency Identification (RFID)-type communication and Far Field (FF) RFID-type communication, and more particularly, to a RFID tag which includes an additional antenna for NF RFID communication and FF RFID communication in a single RFID tag, thereby enabling both types of communications.

2. Background of the Invention

RFID is a technology for providing a contactless automatic identification method that an RFID tag is attached to an object for identification so as to automatically identify the object by using radio signals while carrying out communications with an RFID reader through transceive using the radio signals. The RFID technology can supplement the shortcomings of barcode and optical character recognition technologies which are conventional automatic identification technologies.

Recently, the RFID tag is used in several applications, such as a logistic management system, a user certification system, an electronic money system, and a traffic system.

For example, in the logistic management system, freight is classified or inventory control is performed by using Integrated Circuit (IC) tags in which data is recorded instead of delivery slips or tags. Further, in the user certification system, the entrance management is performed by using an IC card in which personal information is recorded.

In general, non-volatile ferroelectric memory can be used for the RFID tag.

Non-volatile ferroelectric memory, that is, Ferroelectric Random Access Memory (FeRAM) has been in the spotlight as a next-generation memory device as it has a data processing speed comparable to that of Dynamic Random Access Memory (DRAM) and retains its data even after when power is turned off.

FeRAM devices have almost the same structure as that of to DRAMs. FeRAMs use ferroelectric capacitors as storage elements. FeRAMs exhibit a high residual polarization property and can retain data even though an applied electric field might be removed.

RFID uses several frequency bands and has different characteristics according to the frequency bands.

In general, when the RFID frequency band is low, the RFID device is likely to exhibit a slow recognition speed, operate in a short range, and is less influenced by extraneous environmental interference. On the other hand, when the RFID frequency band is high, the RFID device is likely to exhibit a fast recognition speed, operate in a longer range and is prone to extraneous interference from the environment.

Conventional RFID tags are divided into an RFID tag used in a low frequency band and an RFID tag used in a high frequency band. That is, an RFID tag equipped with an antenna enabling communication in a low frequency band and an RFID tag equipped with an antenna enabling communication in a high frequency band separately exist. Accordingly, there is a problem in that different RFID tags should be used according to the particular purpose of use.

BRIEF SUMMARY OF THE INVENTION

Various embodiments of the invention are directed to provide an RFID tag which includes an additional antenna for NF communication and FF communication in a single RFID tag, thereby enabling both types of communications.

According to an embodiment of the present invention, an RFID tag comprises an antenna unit configured to perform communication in a first bandwidth and a second bandwidth, and a voltage rectification unit configured to rectify and boost one or more radio signal received through the antenna unit and configured to generate one or more power voltages corresponding to the radio signals respectively.

According to another embodiment of the present invention, an RFID tag comprises an antenna unit comprising a first antenna configured to perform communication in a first bandwidth and a second antenna configured to perform communication in a second bandwidth, and a voltage rectification unit configured to rectify and boost one or more radio signals received through the antenna unit and configured to generate one or more power voltages corresponding to the respective radio signals. The voltage rectification unit comprises a clamping circuit unit configured to clamp and to output the one or more radio signals, and a rectification circuit unit configured to rectify the signals outputted from the clamping circuit unit and configured to generate a DC voltage.

According to the present invention, an antenna enabling NF communications in a low frequency band and an antenna enabling FF communications in a high frequency band are included in a single RFID tag. Accordingly, there is an advantage in that both NF communication and FF communication can be performed using the single RFID tag.

Further, there is an advantage in that the entire size of a RFID tag can be reduced by applying the ferroelectric capacitors of a high permittivity to the rectifier included in the voltage rectification unit.

DESCRIPTION OF EMBODIMENTS

Figure 1:
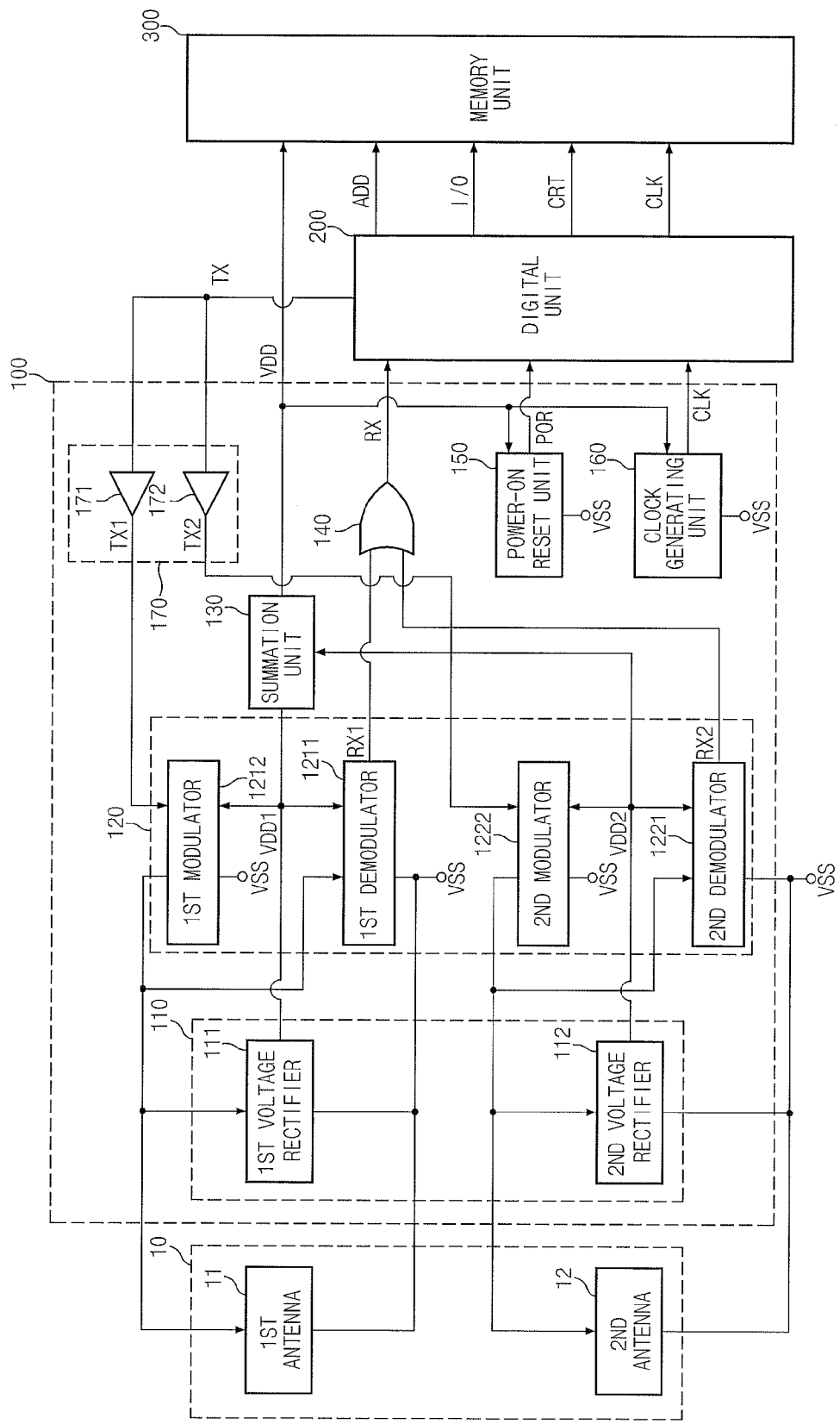
FIG. 1 illustrates an overall configuration of an RFID tag according to the present invention.

Embodiments of the present invention will now be described in detail with reference to the accompanying drawings. Reference numerals and symbols indicated in the drawings denote different elements.

FIG. 1 illustrates an overall configuration of an RFID tag according to the present invention.

Referring to FIG. 1, the RFID tag of the present invention includes an antenna unit 10, an analog unit 100, a digital unit 200, and a memory unit 300.

The antenna unit 10 transceives data between an external reader or writer (not shown) and the RFID tag. The antenna unit 10 includes a first antenna 11 that performs communication in a first bandwidth and a second antenna 12 that performs communication in a second bandwidth. The first bandwidth can preferably be formed in a low frequency domain of 1 MHz or less, and the second bandwidth can preferably be formed in a high frequency domain of 100 MHz or more. The first antenna can be configured to perform NF communication, and the second antenna can be configured to perform FF communication.

The analog unit 100 includes a voltage rectification unit 110, a modulation/demodulation unit 120, a summation unit 130, a logical sum device 140, a power-on reset unit 150, a clock generation unit 160, and a driving unit 170.

The voltage rectification unit 110 includes a first voltage rectifier 111 configured to amplify a radio signal received from the first antenna 11 and a second voltage rectifier 112 configured to amplify a radio signal received from the second antenna 12.

The first voltage rectifier 111 is configured to amplify a received radio signal and generate a power voltage VDD1. The power voltage VDD1 is supplied to a first demodulator 1211 and a first modulator 1212 and the power voltage VDD1 is used as a power voltage.

The second voltage rectifier 112 is configured to amplify a received radio signal and generate a power voltage VDD2. The power voltage VDD2 is supplied to a second demodulator 1221 and a second modulator 1222 and the power voltage VDD2 is used as a power voltage.

The summation unit 130 is configured to receive the power voltage VDD1 and the power voltage VDD2 to sum and to generate a power voltage VDD. That is, the summation unit 130 preferably generates the power voltage VDD in accordance to VDD=VDD1+VDD2. The power voltage VDD is supplied to the power-on reset unit 150, the clock generation unit 160, and the memory unit 300.

The modulation/demodulation unit 120 includes the first demodulator 1211 configured to demodulate a radio signal received from the first antenna 11, the first modulator 1212 configured to modulate a transmission signal TX1 transmitted from the digital unit 200 to the reader, the second demodulator 1221 configured to demodulate a radio signal received from the second antenna 12, and the second modulator 1222 configured to modulate a transmission signal TX2 transmitted from the digital unit 200 to the reader.

The first demodulator 1211 demodulates a radio signal received from the first antenna 11. That is, the first demodulator 1211 detects a reception signal RX1, which is an operation command signal, from the radio signal and outputs to the digital unit 200. The second demodulator 1221 demodulates a radio signal received from the second antenna 12. That is, the second demodulator 1221 detects a reception signal RX2, which is an operation command signal, from the radio signal and outputs to the digital unit 200.

The logical sum device 140 logically sums the reception signal RX1 and the reception signal RX2 and generate a reception signal RX. The reception signal RX is inputted to the digital unit 200. The logical sum device 140 preferably refers to an OR gate.

The power-on reset unit 150 detects the power voltage VDD, which is an output voltage of the voltage rectification unit 110, and outputs a power-on reset signal POR for controlling a reset operation to the digital unit 200.

The clock generation unit 160 supplies the digital unit 200 with a clock CLK for controlling the operation of the digital unit 200 according to the power voltage VDD which is an output voltage of the voltage rectification unit 110.

The digital unit 200 receives the power voltage VDD, the power-on reset signal POR, the clock CLK, and the reception signal RX from the analog unit 100, and analyzes the reception signal RX to generate a transmission signal TX for controlling and processing the RFID tag, and outputs to the analog unit 100.

The driving unit 170 operates the transmission signal TX received from the digital unit 200. The driving unit 170 includes a first driver 171 and a second driver 172. The first driver 171 operates a transmission signal TX1 inputted to the first modulator 1212, and the second driver 172 operates a transmission signal TX2 inputted to the second modulator 1222.

The transmission signal TX1 is modulated in the first modulator 1212 so that it can be transmitted in the first bandwidth, and the modulated signal is transmitted to the reader via the first antenna 11. The transmission signal TX2 is modulated in the second modulator 1222 so that it can be transmitted in the second bandwidth, and the modulated signal is transmitted to the reader via the second antenna 12.

Further, the digital unit 200 outputs an address ADD, input/output data I/O, a control signal CTR, and a clock CLK to the memory unit 300.

The memory unit 300 stores data processed by the digital unit. The memory unit 300 can be configured to read or write data using a non-volatile ferroelectric capacitor element.

Figure 2:
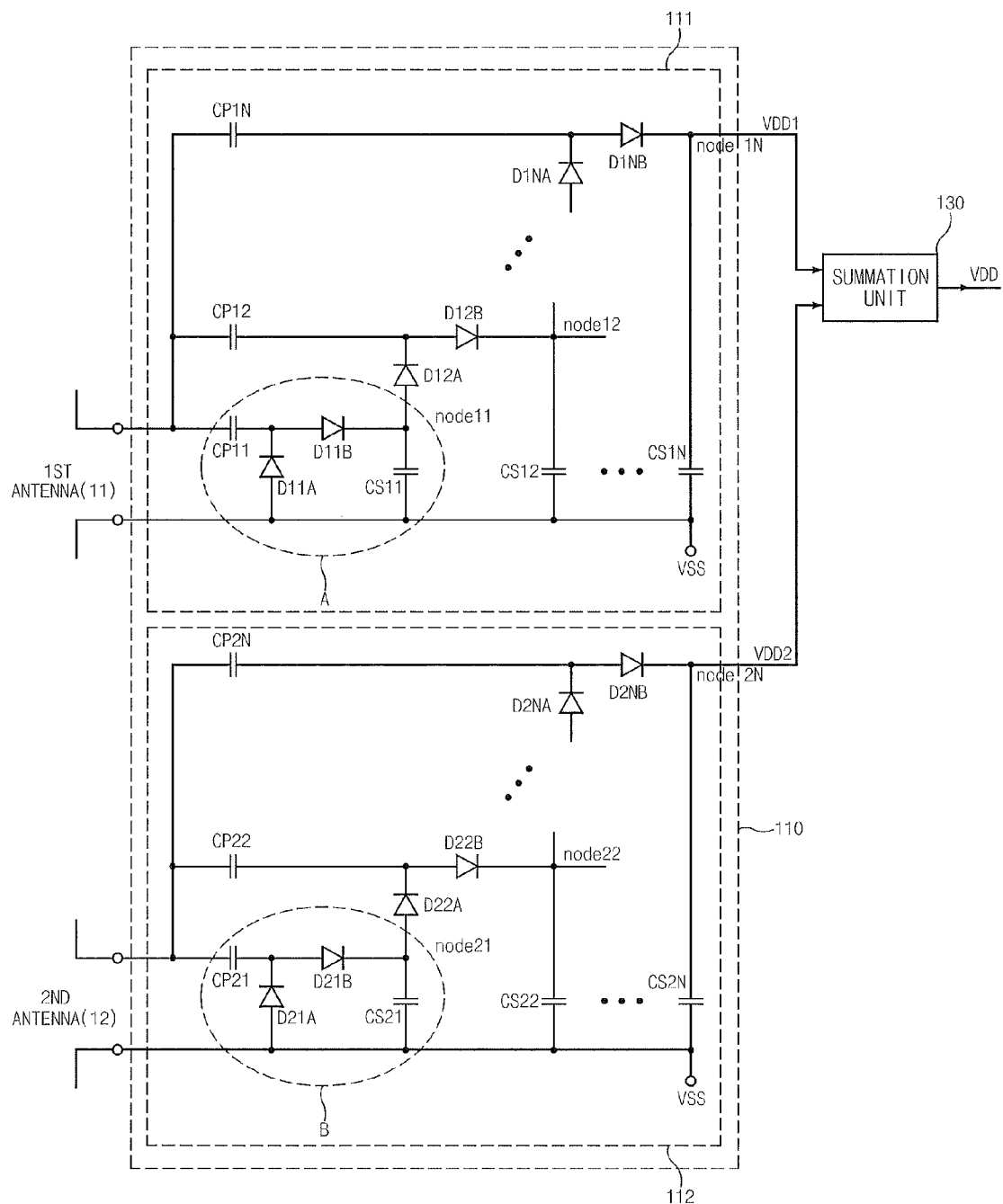
FIG. 2 is a detailed circuit diagram illustrating a voltage rectification unit and a summation unit according to a first embodiment of the present invention.

FIG. 2 is a detailed circuit diagram illustrating one preferred the voltage rectification unit 110 and the summation unit 130 according to a first preferred embodiment of the present invention.

The voltage rectification unit 110 according to the present embodiment includes a first voltage rectifier 111 and a second voltage rectifier 112. The first voltage rectifier 111 includes a plurality of capacitors CS11 to CS1N, CP11 to CP1N and a plurality of Schottky diodes D11A, D11B to D1NA, D1NB. The second voltage rectifier includes a plurality of capacitors CS21 to CS2N, CP21 to CP2N and a plurality of Schottky diodes D21A, D21B to D2NA, D2NB.

The plurality of Schottky diodes D11A, D11B to D1NA, D1NB and the plurality of Schottky diodes D21A, D21B to D2NA, D2NB can be used as rectification components. The Schottky diode can include PN-type or NP-type diode.

The first antenna 11 is configured to perform NF RFID communication carried out in accordance with Faraday's law of induction. The NF RFID communication is a communication method preferably using a low frequency domain of 1 MHz or less. The communication method operates at the distance of 50 cm or less.

The second antenna 12 is configured to perform FF RFID communication carried out in accordance with the principle of electromagnetic energy. The FF RFID communication is a communication method using a high frequency domain of preferably 100 MHz or more. This communication method operates at the distance of 50 cm or more.

Since the present invention receives the radio signals from the first antenna 11 and the second antenna 12, it can transceive radio signals irrespective of the distance between an RF reader and an RF tag.

The radio signals received through the first antenna 11 and the second antenna 12 are inputted to the voltage rectification unit 110. In detail, the radio signal received from the first antenna 11 is rectified and boosted by the first voltage rectifier 111, and the radio signal received from the second antenna 12 is rectified and boosted by the second voltage rectifier 112.

Referring to FIG. 2, the first voltage rectifier 111 preferably includes the plurality of capacitors CP11 to CP1N, CS11 to CS1N and the plurality of diodes D11A, D11B to D1NA, D1NB, and the second voltage rectifier 112 preferably includes the plurality of capacitors CP21 to CP2N, CS21 to CS2N and the plurality of diodes D21A, D21B to D2NA, D2NB.

FIGS. 3a to 3d are diagrams illustrating the operation of the first voltage rectifier 111 according to the first embodiment of the present invention.

Figure 3A:
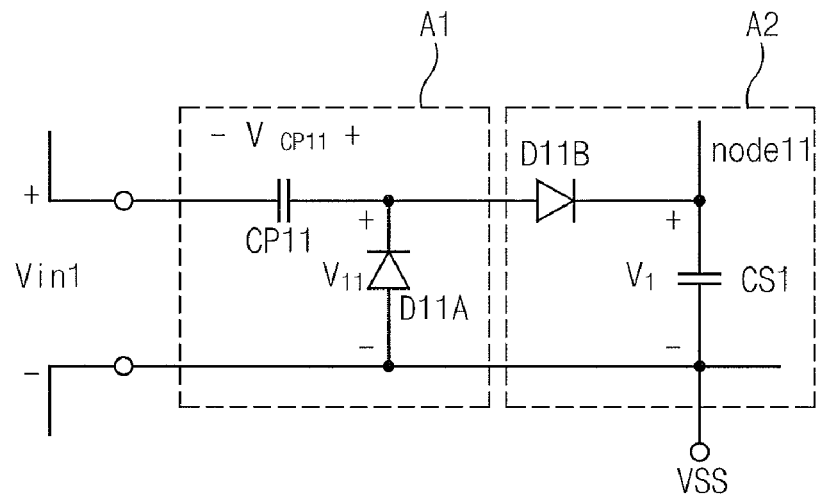
FIGS. 3a to 3d are diagrams illustrating the operation of a first voltage rectifier according to the first embodiment of the present invention.
Figure 3B:
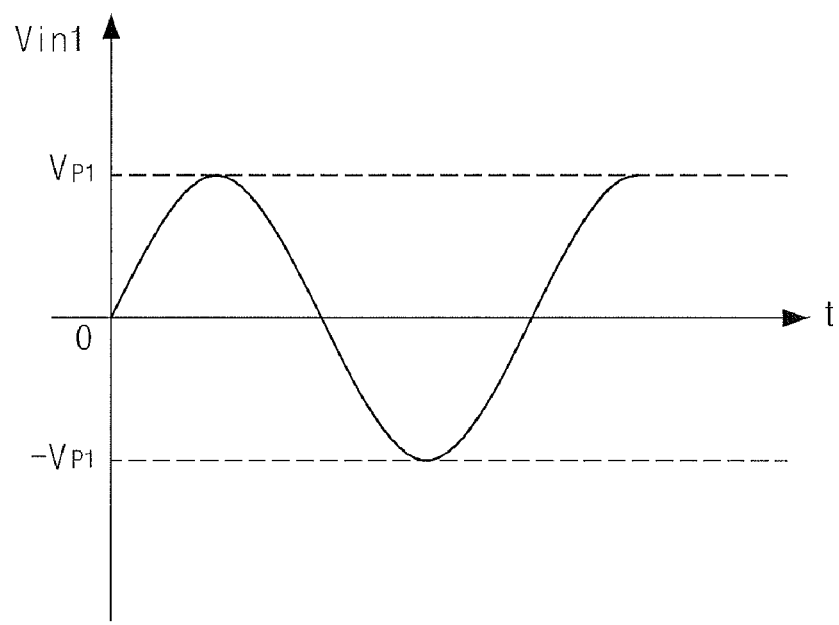
Figure 3C:
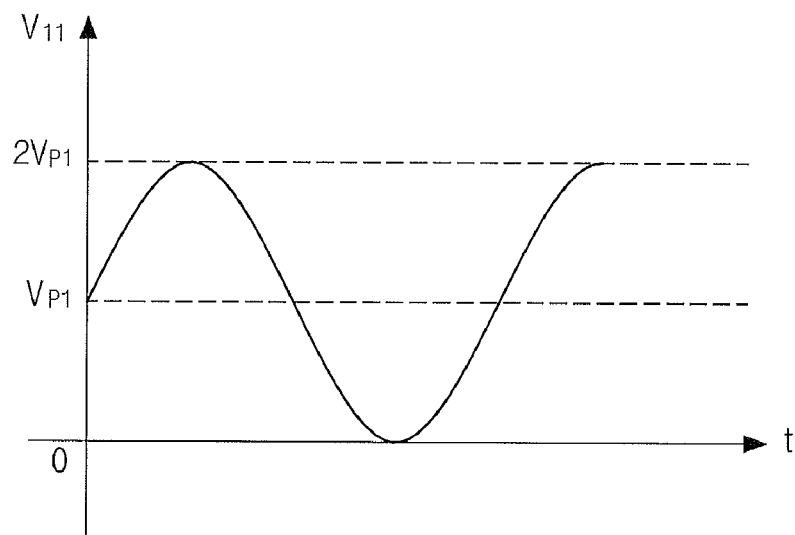
Figure 3D:
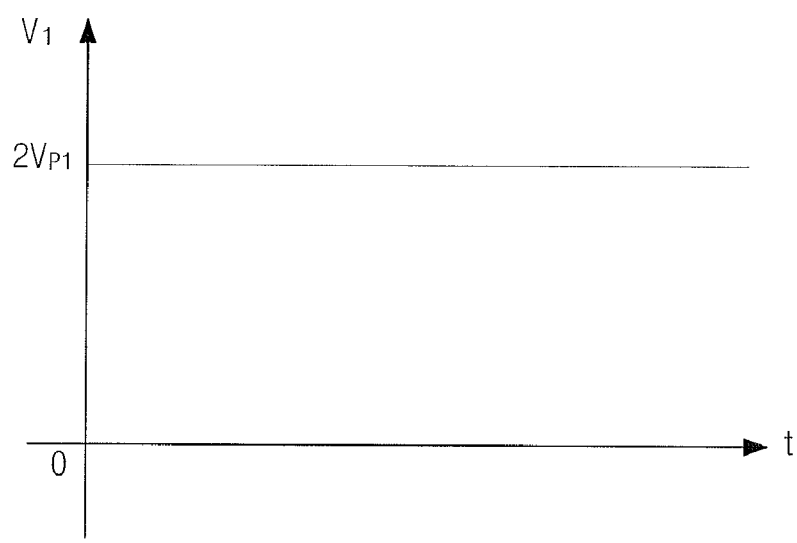
Figure 5:
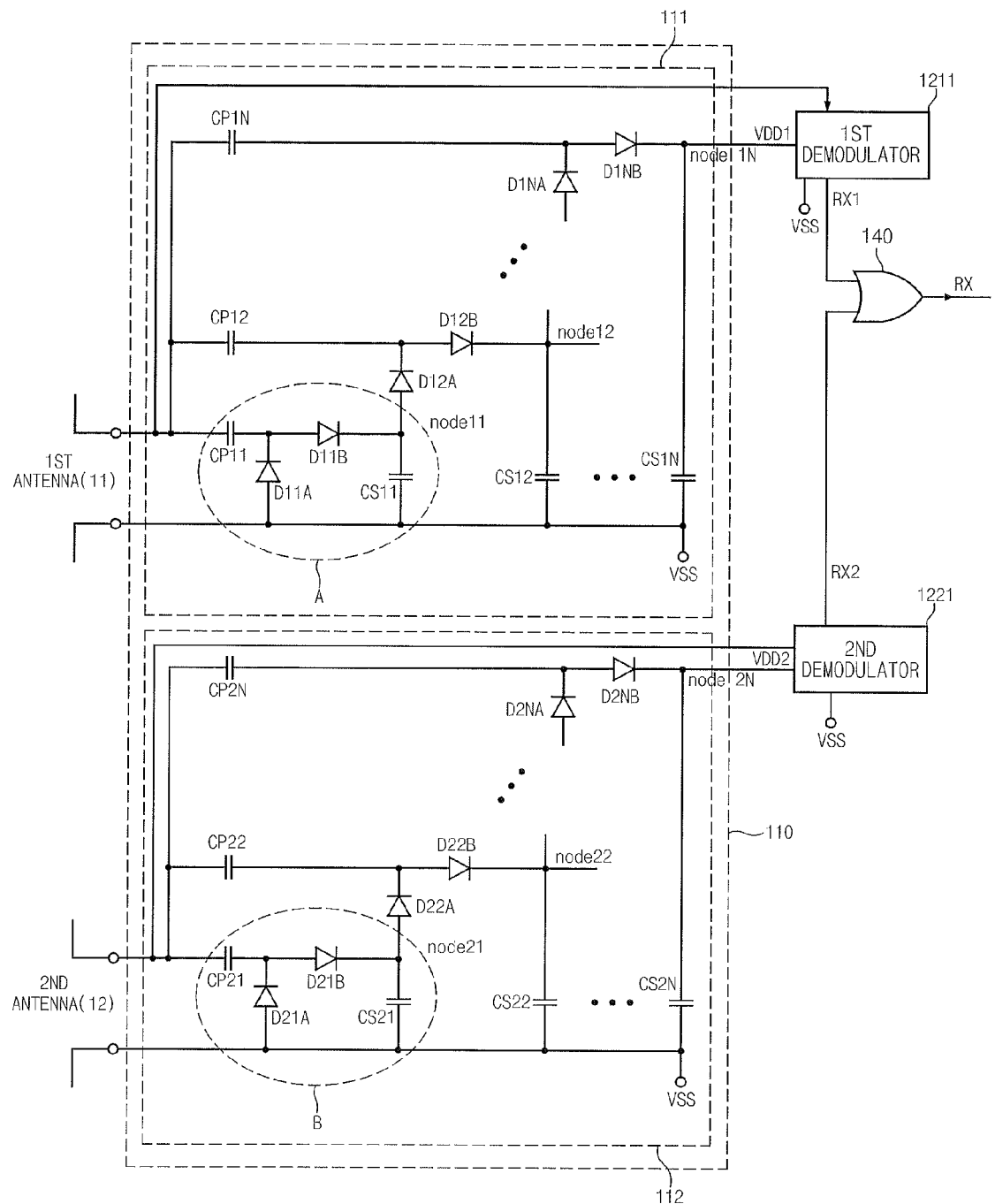
FIG. 5 is a circuit diagram illustrating a modulation/demodulation unit according to the first embodiment of the present invention.

FIG. 3a is a circuit diagram illustrating a portion 'A' of the first voltage rectifier 111 shown in FIG. 2 or in FIG. 5. FIG. 3b illustrates an input waveform of a radio signal received via the first antenna 11. FIG. 3c is a circuit diagram illustrating an A1 partial circuit (hereinafter, 'A1 circuit') shown in FIG. 3a, and FIG. 3d illustrates an output waveform of an A2 partial circuit (hereinafter, 'A2 circuit') shown in FIG. 3a.

Referring to FIG. 3b, an input radio signal Vin1 has a sine wave varying in the range of −Vp1 to Vp1. The input radio signal Vin1 can be any waveform such as a sine wave, a triangle wave, a square wave, or a step wave.

The input radio signal Vin1 becomes an input to the A1 circuit. In the A1 circuit, current flows when the diode D11A is forward-biased while current does not flow when the diode D11A is reverse-biased. That is, only when the input radio signal has a negative voltage, the diode D11A is forward-biased, so that electric charges are accumulated in the capacitor CP11. As a result, voltage as much as −(−Vp1)=Vp1 is applied to the capacitors CP11. Accordingly, it becomes Vcp11=Vp1.

In FIG. 3a, since it becomes Vin1+Vcp11=V11, the signal V11 has a waveform which is obtained by shifting Vin1 by Vcp11 in parallel in the positive direction of the Y axis. As shown in FIG. 3c, the output signal V11 has a sine wave varying in the range of 0 to 2Vp1. In this case, since the lowest peak voltage of the output signal V11 is clamped to 0V, the A1 circuit operates as a clamping circuit.

The signal V11 becomes an input to the A2 circuit. In the A2 circuit, current flows when the diode D11B is forward-biased while current does not flow when the diode D11B is reverse-biased. That is, only when the input signal V11 has a positive voltage, the diode D11B is forward-biased, so that electric charges are accumulated in the capacitor CS11.

When the electric charges are accumulated such that a potential difference greater than a peak voltage 2 Vp1 of the input signal V11 is generated across the capacitor CS11, the electric charges of the capacitors CS11 are not discharged because the diode D11B is reverse-biased. Accordingly, as shown in FIG. 3d, a DC voltage having the magnitude of 2 Vp1 is maintained substantially constant at node 11. In this case, the output signal V1 is rectified into a DC voltage having the highest peak voltage of the input signal V11 such that the A2 circuit operates as a rectification circuit.

Thereafter, the above operation is repeatedly performed by the capacitors CP12, CS22 and the diodes D12A, D12B. Since the voltage of the node 11 is 2 Vp, the DC voltage 2 Vp1+2 Vp1=4 Vp1 is maintained substantially constant at a node 12.

As described above, as the rectification and boosting process is performed, the DC voltage 'N*2 Vp1' is maintained substantially constant at node 1N. Accordingly, the power voltage VDD1 is generated while it becomes 'VDD1=N*2 Vp1'.

Meanwhile, the present invention includes two antennas configured to receive different signals. Accordingly, the process of rectifying and boosting the radio signal received through the first antenna 11 can be identically applied to the case where the radio signal received through the second antenna 12 is rectified and boosted.

FIGS. 4a to 4d are diagrams illustrating the operation of the second voltage rectifier 112 according to the first embodiment of the present invention.

Figure 4A:
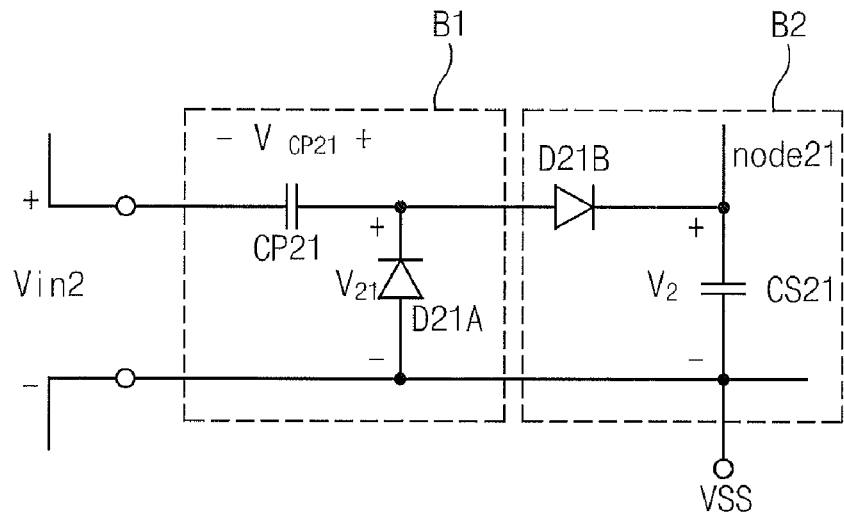
FIGS. 4a to 4d are diagrams illustrating the operation of a second voltage rectifier according to the first embodiment of the present invention.
Figure 4B:
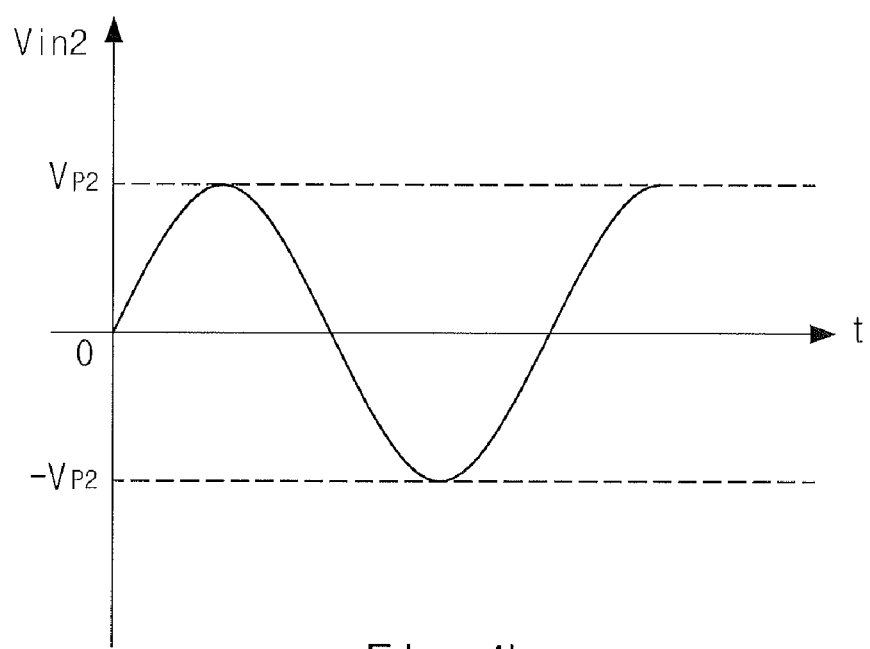
Figure 4C:
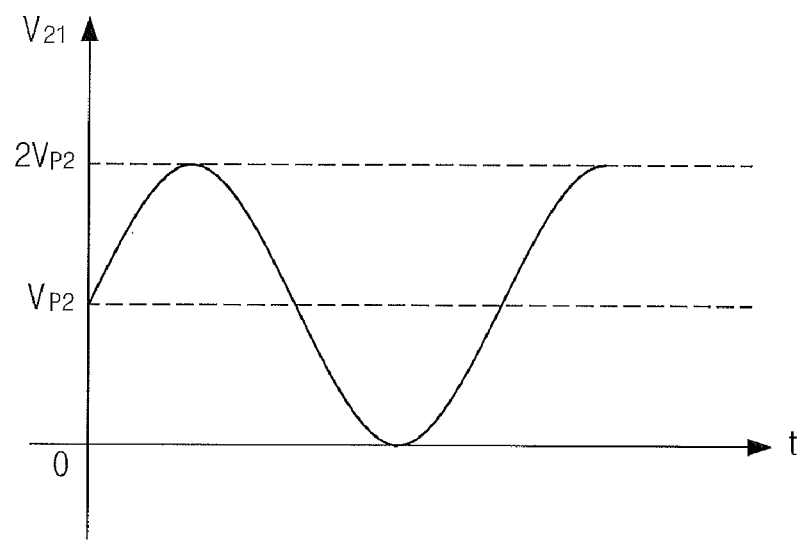
Figure 4D:
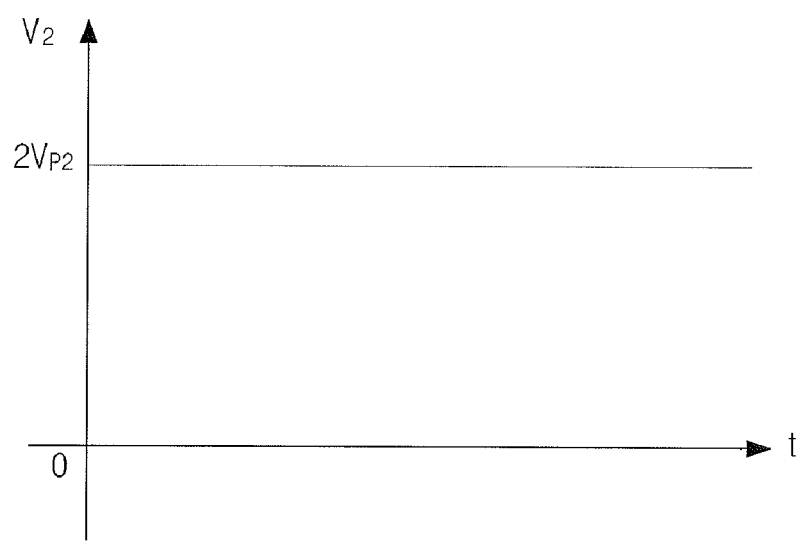

FIG. 4a is a circuit diagram illustrating a portion 'B' of the second voltage rectifier 112 shown in FIG. 2 or in FIG. 5. FIG. 4b illustrates an input waveform of the radio signal received through the second antenna 12. FIG. 4c illustrates an output waveform of a B1 partial circuit (hereinafter, B1 circuit) shown in FIG. 4a. FIG. 4d illustrates an output waveform of a B2 partial circuit (hereinafter, B2 circuit) shown in FIG. 4a.

Referring to FIG. 4b, an input radio signal has a sine wave varying in the range of −Vp2 to Vp2. The input radio signal can be waveform such as those including a sine wave, a triangle wave, a square wave, or a step wave.

The input radio signal becomes an input to the B1 circuit. In the B1 circuit, current flows when the diode D21A is forward-biased while current does not flow when the diode D21A is reverse-biased. That is, only when the input radio signal has a negative voltage, the diode D21A is forward-biased, so that electric charges are accumulated in the capacitor CP21. As a result, voltage as much as −(−Vp2)=Vp2 is applied to the capacitor CP21. Accordingly, it becomes Vcp21=Vp2.

In FIG. 4a, since it becomes Vin2+Vcp21=V21, the signal V21 has a waveform which is obtained by shifting Vin2 by Vcp21 in parallel in the positive direction of the Y axis. As shown in FIG. 4c, the output signal V21 has a sine wave varying in the range of 0 to 2 Vp2. In this case, since the lowest peak voltage of the output signal V21 is clamped to 0 V, the B1 circuit operates as a clamping circuit.

The signal V21 becomes an input to the B2 circuit. In the B2 circuit, current flows when the diode D21B is forward-biased while current does not flow when the diode D21B is reverse-biased. That is, only when the input radio signal has a positive voltage, the diode D21B is forward-biased, so that electric charges are accumulated in the capacitor CS21.

When the electric charges are accumulated in the capacitor CS21 such that a potential difference greater than the peak voltage 2 Vp2 of the input signal V21 is applied across the capacitor CS21, the electric charges of the capacitor CS21 is not discharged because the diode D21B is reverse-biased. Accordingly, as shown in FIG. 4d, a DC voltage having the magnitude of 2 Vp2 is maintained substantially constant at node 21. In this case, the output signal V2 is rectified into a DC voltage having the highest peak voltage of the input signal V21 such that the B2 circuit operates as a rectification circuit.

Thereafter, the above operation is repeatedly performed by the capacitors CP22, CS22 and the diodes D22A, D22B. Since the voltage at node 21 is 2 Vp2, the DC voltage 2 Vp2+2 Vp2=4 Vp2 is maintained substantially constant at node 22.

As described above, as the rectification and boosting process is performed, a DC voltage N*2 Vp2 is maintained substantially constant at node 2N. Accordingly, the power voltage VDD2 is generated and it becomes VDD2=N*2 Vp2.

Referring back to FIG. 2, the power voltages VDD1, VDD2 generated by the first voltage rectifier 111 and the second voltage rectifier 112 become an input to the summation unit 130. The summation unit 130 is configured to perform an operation of adding the power voltages VDD1 and VDD2 which are input signals. As a result, a power voltage VDD which is obtained by adding the power voltage VDD1 to the power voltage VDD2 is generated and outputted to the power-on reset unit 150, the clock generation unit 160, and the memory unit 300. The summation unit 130 can be implemented preferably using an op amplifier in various ways.

The RFID tag of the present invention has two antennas coupled to each other in parallel. The cases where the two antennas receive radio signals can be classified into i) a case where only the first antenna 11 receives the radio signal, ii) a case where only the second antenna 12 receives the radio signal, and iii) a case where the first and second antennas simultaneously receive radio signals.

In the case of i), the power voltage VDD1 is generated from the radio signal received by the first antenna 11 through the above-described rectification and boosting operation, and it becomes VDD=VDD1.

In the case of ii), the power voltage VDD2 is generated from the radio signal received by the second antenna 12 through the above-described rectification and boosting operation, and it becomes VDD=VDD2.

In the case of iii), since the first and second antennas 11 and 12 receive the radio signals simultaneously, the power voltages VDD1 and VDD2 are generated through the above-described rectification and boosting operation, and it becomes VDD=VDD1+VDD2.

FIG. 5 is a circuit diagram illustrating the modulation/demodulation unit 120 according to the first embodiment of the present invention.

Referring to FIG. 5, the radio signals received through the first antenna 11 and the second antenna 12 are respectively inputted to the first demodulator 1211 and the second demodulator 1221. The first demodulator 1211 demodulates the radio signal received from the first antenna 11, detects and outputs a reception signal RX1, which is an operation command signal, from the radio signal. The second demodulator 1221 demodulates the radio signal received from the second antenna 12, detects and outputs a reception signal RX2, which is an operation command signal, from the radio signal.

The logical sum device 140 is configured to logically sum the reception signal RX1 and the reception signal RX2 and generate a reception signal RX. The reception signal RX is inputted to the digital unit 200.

The logical sum device 140 can be implemented with an OR gate. That is, the logical sum device 140 outputs the reception signal RX of high level although any one of the reception signals RX1 and RX2 has a logic high level.

Figure 6:
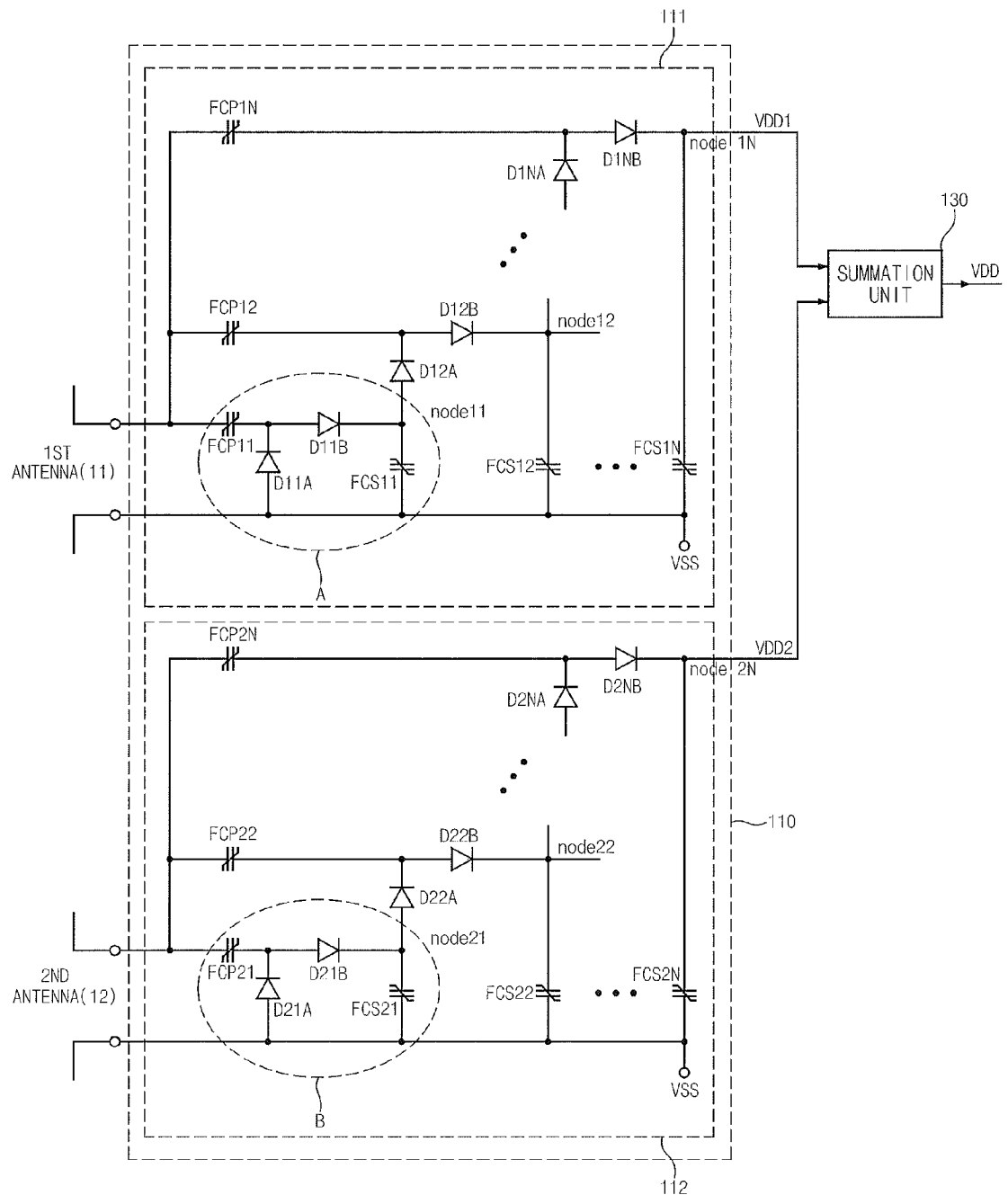
FIG. 6 is a detailed circuit diagram illustrating a voltage rectification unit and a summation unit according to a second embodiment of the present invention.

FIG. 6 is a detailed circuit diagram illustrating the voltage rectification unit 110 and the summation unit 130 according to a second embodiment of the present invention.

The voltage rectification unit 110 according to the present embodiment includes the first voltage rectifier 111 and the second voltage rectifier 112. The first voltage rectifier 111 includes a plurality of ferroelectric capacitors FCS11 to FCS1N, FCP11 to FCP1N and a plurality of Schottky diodes D11A, D11B to D1NA, D1NB. The second voltage rectifier 112 includes a plurality of ferroelectric capacitors FCS21 to FCS2N, FCP21 to FCP2N and a plurality of Schottky diodes D21A, D21B to D2NA, D2NB.

The plurality of Schottky diodes D11A, D11B to D1NA, D1NB and the plurality of Schottky diodes D21A, D21B to D2NA, D2NB are used as rectification components. The Schottky diodes can be implemented with PN-type or NP-type diodes.

The first antenna 11 performs NF RFID communication carried out in accordance with Faraday's law of induction. The NF RFID communication is a communication method using a low frequency domain of 1 MHz or less. This communication method preferably operates at a distance of 50 cm or less.

The second antenna 12 performs FF RFID communication carried out in accordance with the principle of electromagnetic energy. The FF RFID communication is a communication method using a high frequency domain of 100 MHz or more. The communication method preferably operates at a distance of 50 cm or more.

According to the present invention, radio signals can be transceived irrespective of the distance between the RF reader and the RF tag because the radio signals are received from the first antenna 11 and the second antenna 12.

The radio signals received through the first antenna 11 and the second antenna 12 are inputted to the voltage rectification unit 110. In detail, the radio signal received from the first antenna 11 is rectified and boosted by the first voltage rectifier 111, and the radio signal received from the second antenna 12 is rectified and boosted by the second voltage rectifier 112.

Referring to FIG. 6, the first voltage rectifier 111 includes the plurality of ferroelectric capacitors FCP11 to FCP1N, FCS11 to FCS1N and the plurality of diodes D11A, D11B to D1NA, D1NB. The second voltage rectifier 112 includes the plurality of ferroelectric capacitors FCP21 to FCP2N, FCS21 to FCS2N and the plurality of diodes D21A, D21B to D2NA, D2NB.

FIGS. 7a to 7d are diagrams illustrating the operation of the first voltage rectifier 111 according to the second embodiment of the present invention.

Figure 7A:
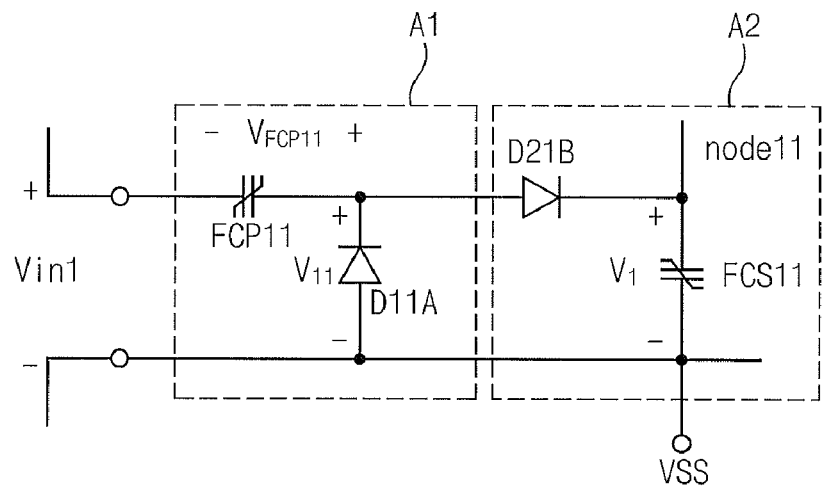
FIGS. 7a to 7d are diagrams illustrating the operation of a first voltage rectifier according to the second embodiment of the present invention.
Figure 7B:
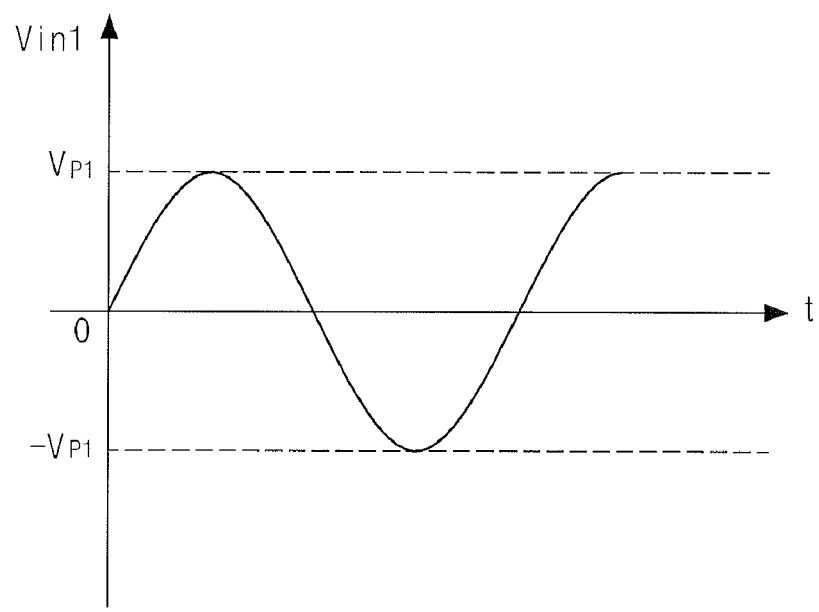
Figure 7C:
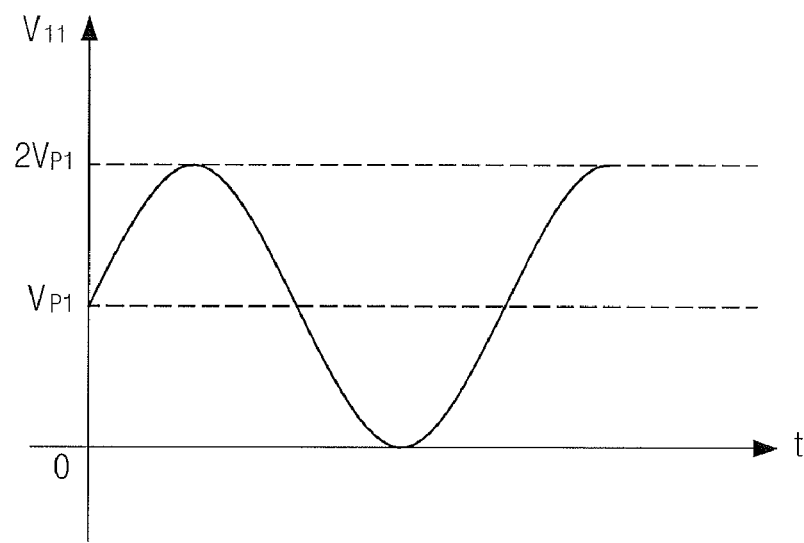
Figure 7D:
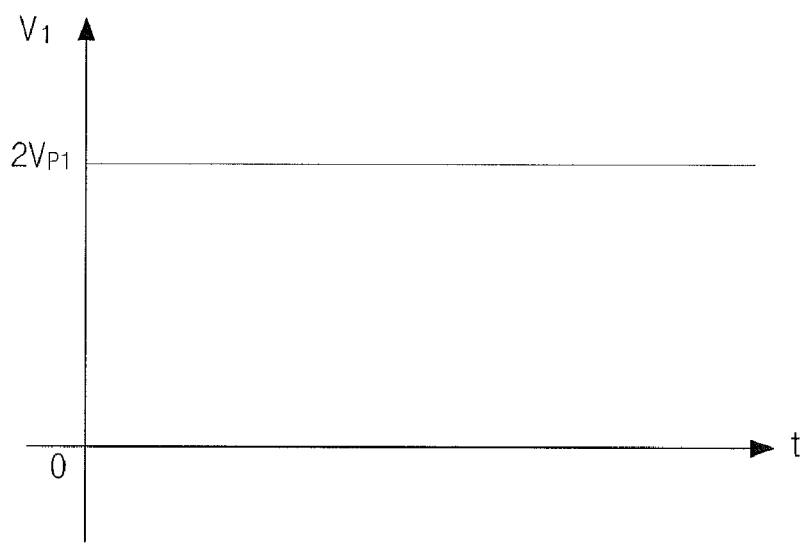
Figure 9:
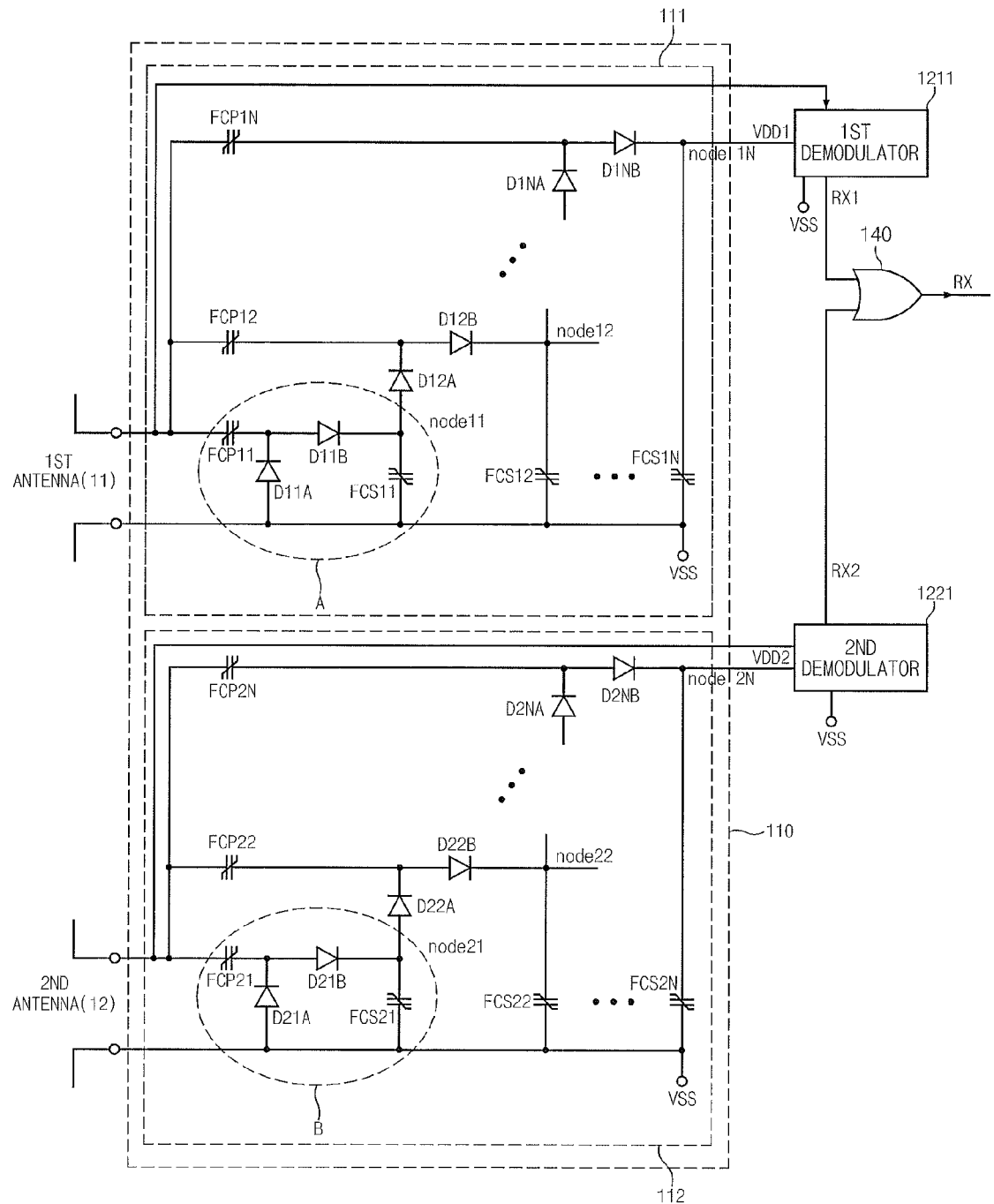
FIG. 9 is a circuit diagram illustrating a modulation/demodulation unit according to the second embodiment of the present invention.

FIG. 7a is a circuit diagram illustrating a portion 'A' of the first voltage rectifier 111 shown in FIG. 6 or in FIG. 9. FIG. 7b illustrates an input waveform of the radio signal received through the first antenna 11. FIG. 7c illustrates an output waveform of an A1 partial circuit (hereinafter, A1 circuit) shown in FIG. 7a. FIG. 7d illustrates an output waveform of an A2 partial circuit (hereinafter, A2 circuit) shown in FIG. 7a.

Referring to FIG. 7b, an input radio signal Vin1 has a sine wave varying in the range of −Vp1 to Vp1. The input radio signal can be any waveform such as those including a sine wave, a triangle wave, a square wave, or a step wave.

The input radio signal Vin1 becomes an input to the A1 circuit. In the A1 circuit, current flows when the diode D11A is forward-biased while current does not flow when the diode D11A is reverse-biased. That is, only when the input radio signal has a negative voltage, the diode D11A is forward-biased such that electric charges are accumulated in the ferroelectric capacitor FCP11. As a result, voltage as much as −(−Vp1)=Vp1 is applied to the ferroelectric capacitor FCP11. Accordingly, it becomes VFCP11=Vp1.

In FIG. 7a, since it becomes Vin1+VFCP11=V11, the signal V11 has a waveform which is obtained by shifting Vin1 by VFCP11 in parallel in the positive direction of the Y axis. As shown in FIG. 7c, the signal V11 has a sine wave varying in the range of 0 to 2 Vp1. In this case, the A1 circuit operates as a clamping circuit because the lowest peak voltage of the output signal V11 is clamped to 0 V.

The signal V11 becomes an input to the A2 circuit. In the A2 circuit, current flows when the diode D11B is forward-biased while current does not flow when the diode D11B is reverse-biased. That is, only when the input signal V11 has a positive voltage, the diode D11B is forward-biased such that electric charges are accumulated in the ferroelectric capacitor FCS11.

When the electric charges are accumulated in the ferroelectric capacitor FCS11 and a potential difference greater than the peak voltage 2 Vp1 of the input signal V11 is applied across the ferroelectric capacitor FCS11, the electric charges of the ferroelectric capacitor FCS11 are not discharged because the diode D11B is reverse-biased. Accordingly, as shown in FIG. 7d, a DC voltage having the magnitude of 2 Vp1 is maintained substantially constant at node 11. In this case, since the output signal V1 is rectified into a DC voltage having the highest peak voltage of the input signal V11, the A2 circuit operates as a rectification circuit.

Thereafter, the above operation is repeatedly performed by the ferroelectric capacitors FCP12, FCS12 and the diodes D12A, D12B. Since the voltage of the node 11 is 2 Vp, a DC voltage 2 Vp1+2 Vp1=4 Vp1 is maintained substantially constant at node 12.

As described above, as the rectification and boosting process is performed, a DC voltage N*2 Vp1 is maintained substantially constant at node 1N. Accordingly, the power voltage VDD1 is generated, and it becomes VDD1=N*2 Vp1.

Meanwhile, the present invention includes two antennas configured to receive different signals. Accordingly, the process of rectifying and boosting a radio signal received through the first antenna can be identically applied to the case where a radio signal received through the second antenna 12 is rectified and boosted.

FIGS. 8a to 8d are diagrams illustrating the operation of the second voltage rectifier 112 according to the second embodiment of the present invention.

Figure 8A:
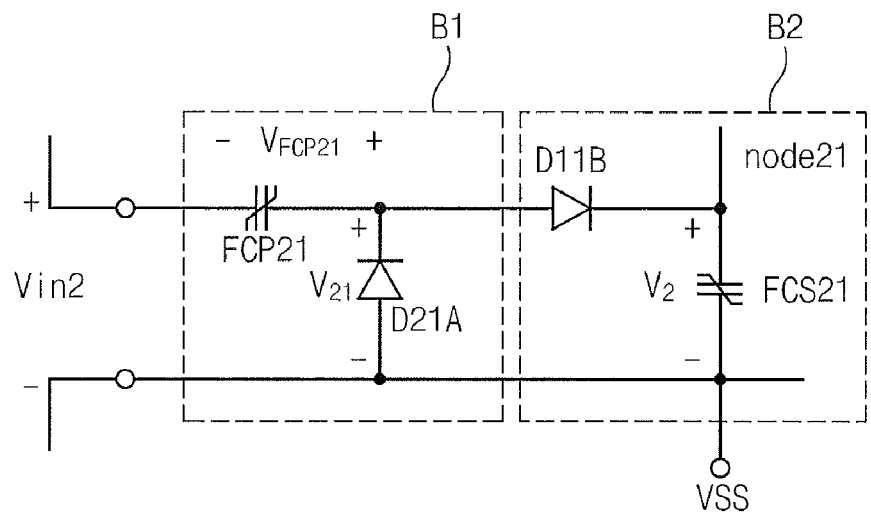
FIGS. 8a to 8d are diagrams illustrating the operation of a second voltage rectifier according to the second embodiment of the present invention.
Figure 8B:
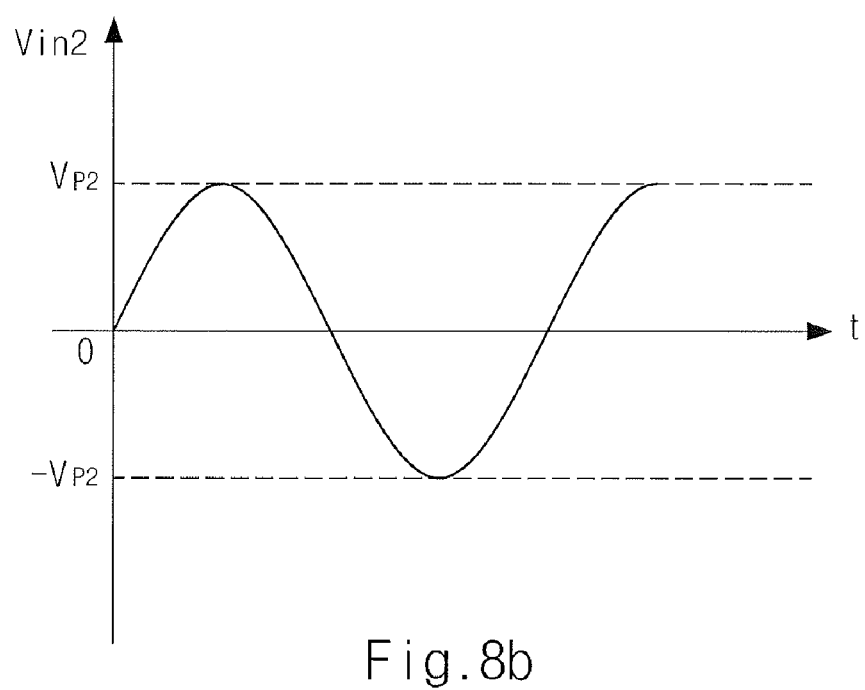
Figure 8C:
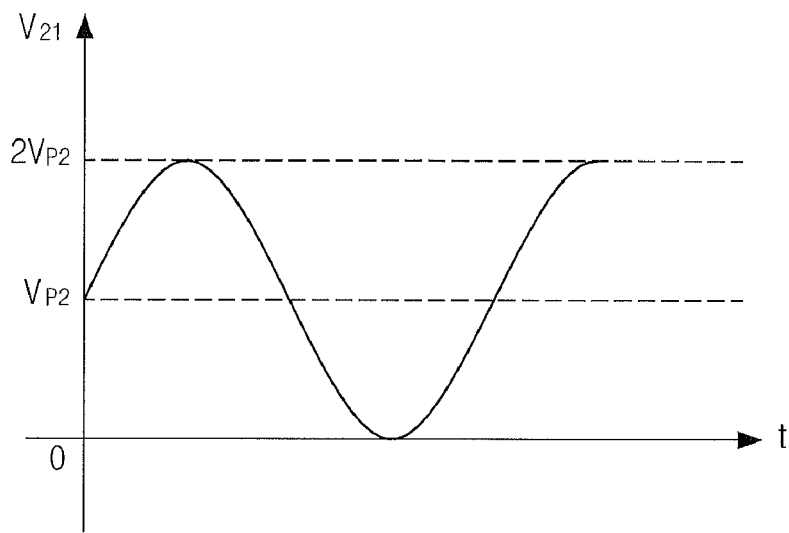
Figure 8D:
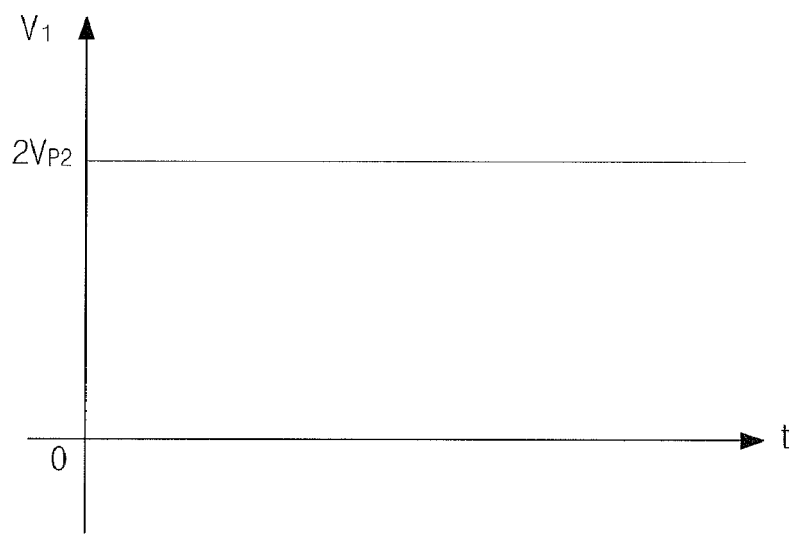

FIG. 8a is a circuit diagram illustrating a portion 'B' of the second voltage rectifier 112 shown in FIG. 6 or in FIG. 9. FIG. 8b illustrates an input waveform of the radio signal received through the second antenna 12. FIG. 8c illustrates an output waveform of a B1 partial circuit (hereinafter, B1 circuit) shown in FIG. 8a. FIG. 8d illustrates the output waveform of a B2 partial circuit (hereinafter, B2 circuit) shown in FIG. 8a.

Referring to FIG. 8b, an input radio signal is a sine wave varying in the range of −Vp2 to Vp2. The input radio signal can any type of waveform such as those including a sine wave, a triangle wave, a square wave, or a step wave.

The input radio signal becomes an input to the B1 circuit. In the B1 circuit, current flows when the diode D21A is forward-biased while current does not flow when the diode D21A is reverse-biased. That is, only when the input radio signal has a negative voltage, the diode D21A is forward-biased, such that electric charges are accumulated in the ferroelectric capacitor FCP21. As a result, voltage as much as −(−Vp2)=Vp2 is applied to the ferroelectric capacitor FCP21. Accordingly, it becomes VFCP21=Vp2. In FIG. 8a, since, it becomes Vin2+VFCP21=V21, the output signal V21 has a waveform which is obtained by shifting Vin2 by VFCP21 in parallel in the positive direction of the Y axis. As shown in FIG. 8c, the output signal V21 has a sine wave varying in the range of 0 to 2 Vp2. In this case, since the lowest peak voltage of the output signal V21 is clamped to 0 V, the B1 circuit operates as a clamping circuit.

The output signal V21 becomes an input to the B2 circuit. In the B2 circuit, current flows when the diode D21B is forward-biased while current does not flow when the diode D21B is reverse-biased. That is, only when the input radio signal has a positive voltage, the diode D21B is forward-biased, so that electric charges are accumulated in the ferroelectric capacitor FCS21.

When the electric charges are accumulated in the ferroelectric capacitor FCS21 and a potential difference greater than the peak voltage 2 Vp2 of the input signal V21 is applied across the ferroelectric capacitor FCS21, the electric charges of the ferroelectric capacitor FCS21 are not discharged because the diode D21B is reverse-biased. Accordingly, as shown in FIG. 8d, a DC voltage having the magnitude of 2 Vp2 is maintained substantially constant at node 21. In this case, the A2 circuit operates as a rectification circuit because the output signal V2 is rectified into a DC voltage having the highest peak voltage of the input signal V21.

Thereafter, the above operation is repeatedly performed by the ferroelectric capacitors FCP22, FCS22 and the diodes D22A, D22B. Since the voltage of the node 21 is 2 Vp2, a DC voltage 2 Vp2+2 Vp2=4 Vp2 is maintained substantially constant at node 22.

As the rectification and boosting process is performed as described above, a DC voltage N*2 Vp2 is maintained substantially constant at node 2N. Accordingly, the power voltage VDD2 is generated and it becomes VDD2=N*2 Vp2.

Referring back to FIG. 6, the power voltages VDD1 and VDD2 generated by the first voltage rectifier 111 and the second voltage rectifier 112 become an input to the summation unit 130. The summation unit 130 is configured to perform an operation of adding the power voltages VDD1 and VDD2 which are input signals. As a result, a power voltage VDD which is obtained by adding the power voltage VDD1 to the power voltage VDD2 is generated and outputted to the power-on reset unit 150, the clock generation unit 160, and the memory unit 300. The summation unit 130 can be implemented with an op amplifier in various ways.

The RFID tag of the present invention has two antennas coupled to each other in parallel. The cases where the two antennas receive radio signals can be classified into i) a case where only the first antenna 11 receives the radio signal, ii) a case where only the second antenna 12 receives the radio signal, and iii) a case where the first and second antennas receive the radio signals simultaneously.

In the case of i), the power voltage VDD1 is generated from the radio signal received by the first antenna 11 through the above-described rectification and boosting operation, and it becomes VDD=VDD1.

In the case of ii), the power voltage VDD2 is generated from the radio signal received by the second antenna 12 through the above-described rectification and boosting operation, and it becomes VDD=VDD2.

In the case of iii), since the first and second antennas 11 and 12 receive the radio signals simultaneously, the power voltages VDD1 and VDD2 are generated through the above-described rectification and boosting operation, and it becomes VDD=VDD1+VDD2.

FIG. 9 is a circuit diagram illustrating a modulation/demodulation unit 120 according to the second embodiment of the present invention.

Referring to FIG. 9, the radio signals received through the first antenna 11 and the second antenna 12 are respectively inputted to the first demodulator 1211 and the second demodulator 1221. The first demodulator 1211 demodulates the radio signal received from the first antenna 11, detects and outputs a reception signal RX1, which is an operation command signal, from the radio signal. The second demodulator 1221 demodulates the radio signal received from the second antenna 12, detects and outputs a reception signal RX2, which is an operation command signal, from the radio signal.

The logical sum device 140 is configured to logically sum the reception signal RX1 and the reception signal RX2 and generate a reception signal RX. The reception signal RX is inputted to the digital unit 200.

The logical sum device 140 can be implemented with an OR gate. That is, the logical sum device 140 outputs the reception signal RX of high level although any one of the reception signals RX1 and RX2 has a logic high level.

Figure 10:
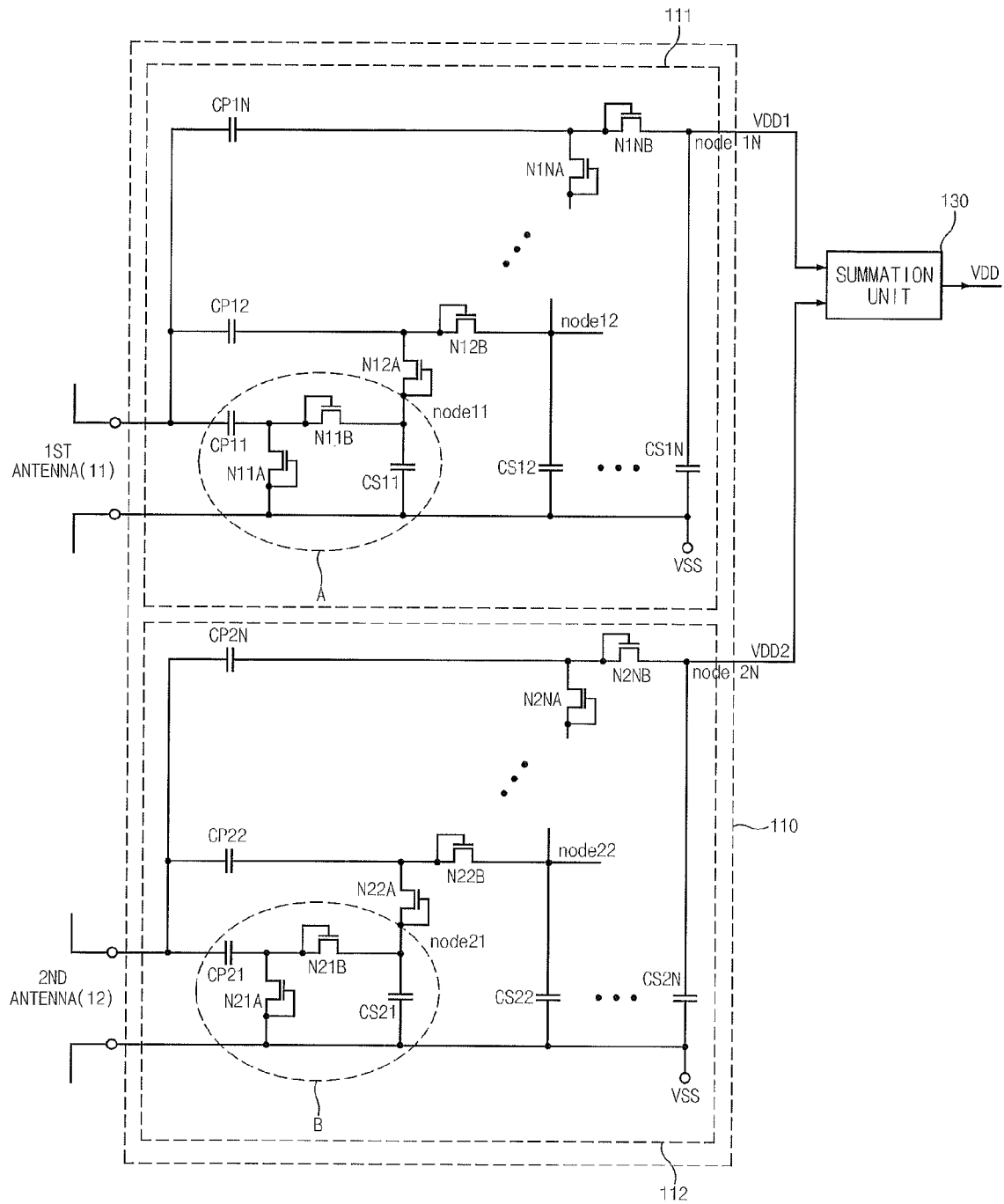
FIG. 10 is a detailed circuit diagram illustrating a voltage rectification unit and a summation unit according to a third embodiment of the present invention.

FIG. 10 is a detailed circuit diagram illustrating a voltage rectification unit and a summation unit according to a third embodiment of the present invention;

The voltage rectification unit 110 according to the present embodiment includes a first voltage rectifier 111 and a second voltage rectifier 112. The first voltage rectifier 111 includes a plurality of capacitors CS11 to CS1N, CP11 to CP1N and a plurality of NMOS transistors N11A, N11B to N1NA, N1NB. The second voltage rectifier 112 includes a plurality of capacitors CS21 to CS2N, CP21 to CP2N and a plurality of NMOS transistors N21A, N21B to N2NA, N2NB.

The plurality of NMOS transistors N11A, N11B to N1NA, N1NB and the plurality of NMOS transistors N21A, N21B to N2NA, N2NB are used as rectification components. The NMOS transistors can be implemented using PN-type or NP-type NMOS transistors.

The first antenna 11 performs NF RFID communication carried out in accordance with Faraday's law of induction. The NF RFID communication is a communication method using a low frequency domain of 1 MHz or less. This communication method preferably operates in the distance of 50 cm or less.

The second antenna 12 performs FF RFID communication carried out in accordance with the principle of electromagnetic energy. The FF RFID communication is a communication method using a high frequency domain of 100 MHz or more. The communication method preferably operates in the distance of 50 cm or more.

According to the present invention, radio signals can be transceived irrespective of the distance between the RF reader and the RF tag because the radio signals are received from the first antenna 11 and the second antenna 12.

The radio signals received through the first antenna 11 and the second antenna 12 are inputted to the voltage rectification unit 110. In detail, the radio signal received from the first antenna 11 is rectified and boosted by the first voltage rectifier 111, and the radio signal received from the second antenna 12 is rectified and boosted by the second voltage rectifier 112.

Referring to FIG. 10, the first voltage rectifier 111 includes the plurality of capacitors CP11 to CP1N, CS11 to CS1N and the plurality of NMOS transistors N11A, N11B to N1NA, N1NB. The second voltage rectifier 112 includes the plurality of capacitors CP21 to CP2N, CS21 to CS2N and the plurality of NMOS transistors N21A, N21B to N2NA, N2NB.

FIGS. 11a to 11d are diagrams illustrating the operation of a first voltage rectifier 111 according to a third embodiment of the present invention.

Figure 11A:
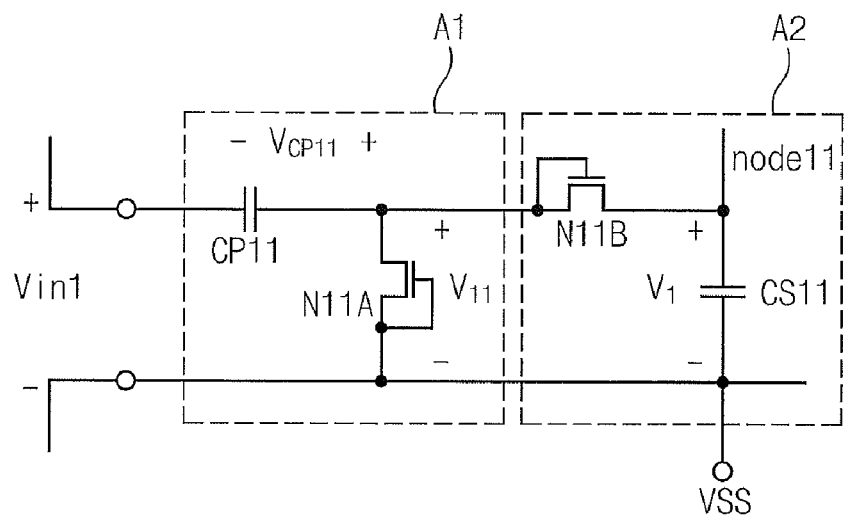
FIGS. 11a to 11d are diagrams illustrating the operation of a first voltage rectifier according to the third embodiment of the present invention.
Figure 11B:
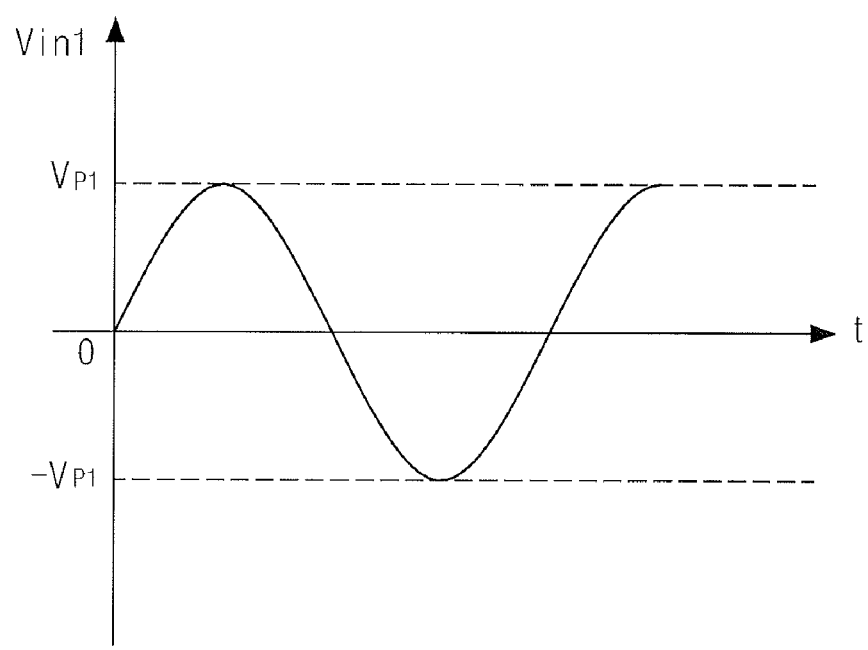
Figure 11C:
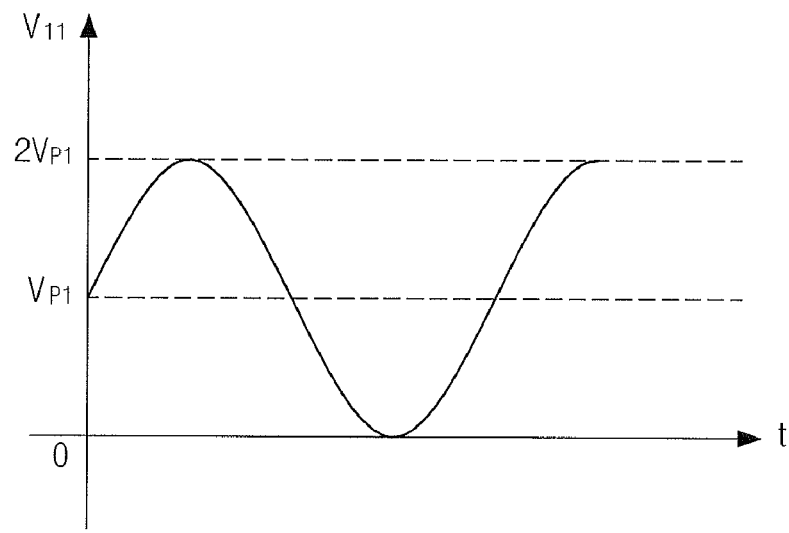
Figure 11D:
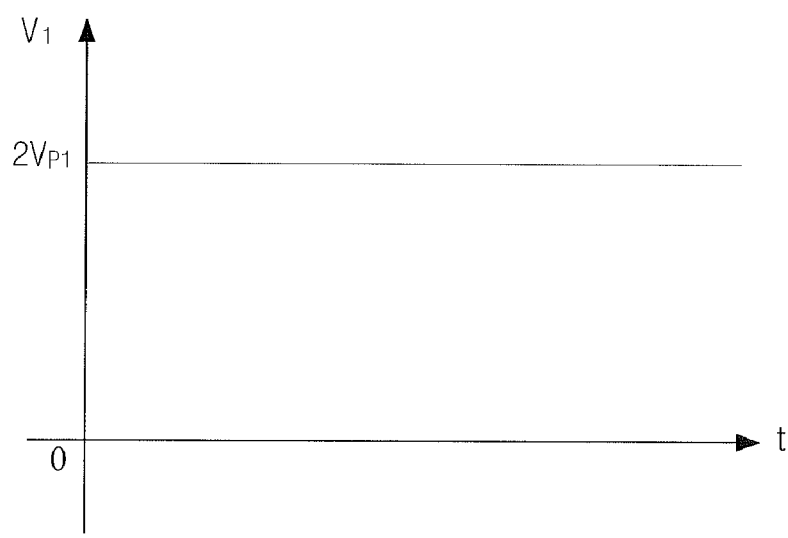
Figure 13:
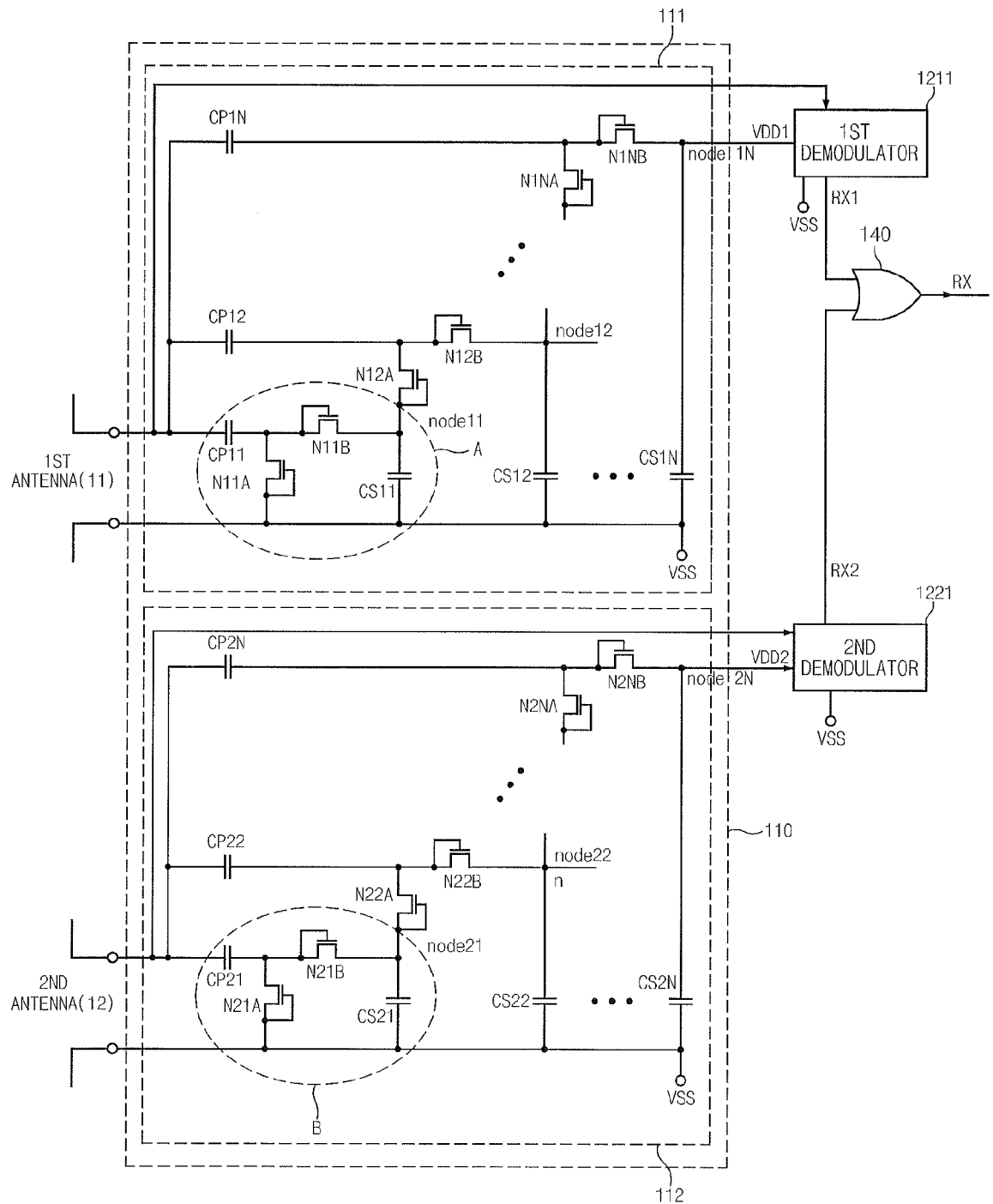
FIG. 13 is a circuit diagram illustrating a modulation/demodulation unit according to the third embodiment of the present invention.

FIG. 11a is a circuit diagram illustrating a portion 'A' of the first voltage rectifier 111 shown in FIG. 10 or in FIG. 13. FIG. 11b illustrates an input waveform of the radio signal received through the first antenna 11. FIG. 11c illustrates an output waveform of an A1 partial circuit (hereinafter, A1 circuit) shown in FIG. 11a. FIG. 11d illustrates an output waveform of an A2 partial circuit (hereinafter, A2 circuit) shown in FIG. 11a.

Referring to FIG. 11b, an input radio signal Vin1 has a sine wave varying in the range of −Vp1 to Vp1. The input radio signal can be any waveform such as those including a sine wave, but a triangle wave, a square wave, or a step wave.

The input radio signal becomes an input to the A1 circuit. In the A1 circuit, current flows when a NMOS transistor N11A is turned on while current does not flow when the NMOS transistor N11A is turned off. That is, only when the input radio signal has a negative voltage, the NMOS transistor N11A is turned on such that electric charges are accumulated in a capacitor CP11. As a result, the voltage as much as −(−Vp1)=Vp1 is applied to the capacitor CP11. Accordingly, it becomes VCP11=Vp1.

In FIG. 11a, since it becomes Vin1+VCP11=V11, the signal V11 has a waveform which is obtained by shifting Vin1 by VCP11 in parallel in the positive direction of the Y axis. As shown in FIG. 11c, the signal V11 has a sine wave varying in the range of 0 to 2 Vp1. In this case, the A1 circuit operates as a clamping circuit because the lowest peak voltage of the output signal V11 is clamped to 0 V.

The signal V11 becomes an input to the A2 circuit. In the A2 circuit, current flows when a NMOS transistor N11B is turned on while current does not flow when the NMOS transistor N11B is turned off. That is, only when the input signal V11 has a positive voltage, the NMOS transistor N11B is turned on such that electric charges are accumulated in a capacitor CS11.

When the electric charges are accumulated in the capacitor CS11 and a potential difference greater than the peak voltage 2 Vp1 of the input signal V11 is applied across the capacitor CS11, the electric charges of the ferroelectric capacitor FCS11 are not discharged because the NMOS transistor N11B is turned off. Accordingly, as shown in FIG. 11d, a DC voltage having the magnitude of 2 Vp1 is maintained substantially constant at node 11. In this case, since the output signal V1 is rectified into a DC voltage having the highest peak voltage of the input signal V11, the A2 circuit operates as a rectification circuit.

Thereafter, the above operation is repeatedly performed by the capacitors CP12, CS22 and the NMOS transistors N12A, N12B. Since the voltage of the node 11 is 2 Vp, a DC voltage 2 Vp1+2 Vp1=4 Vp1 is maintained substantially constant node 12.

As described above, as the rectification and boosting process is performed, a DC voltage N*2 Vp1 is maintained substantially constant at node 1N. Accordingly, the power voltage VDD1 is generated, and it becomes VDD1=N*2 Vp1.

Meanwhile, the present invention includes two antennas configured to receive different signals. Accordingly, the process of rectifying and boosting a radio signal received through the first antenna 11 can be identically applied to the case where a radio signal received through the second antenna 12 is rectified and boosted.

FIGS. 12a to 12d are diagrams illustrating the operation of the second voltage rectifier 112 according to the third embodiment of the present invention.

Figure 12A:
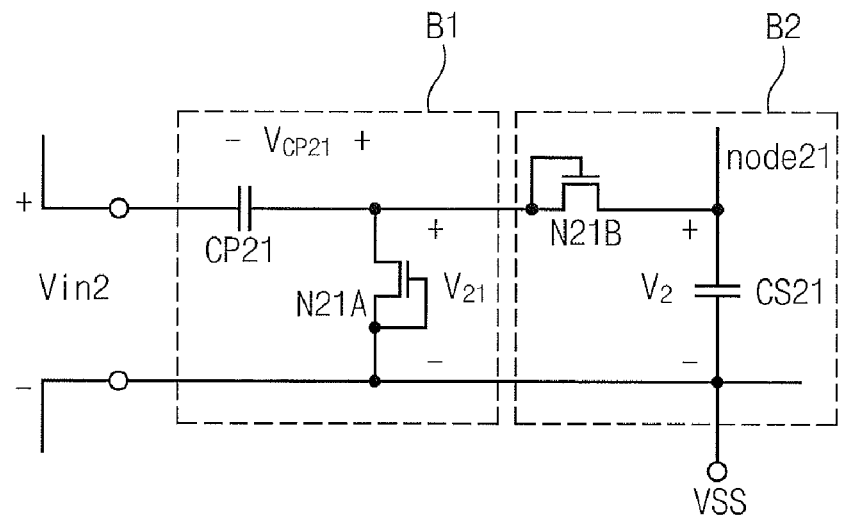
FIGS. 12a to 12d are diagrams illustrating the operation of a second voltage rectifier according to the third embodiment of the present invention.
Figure 12B:
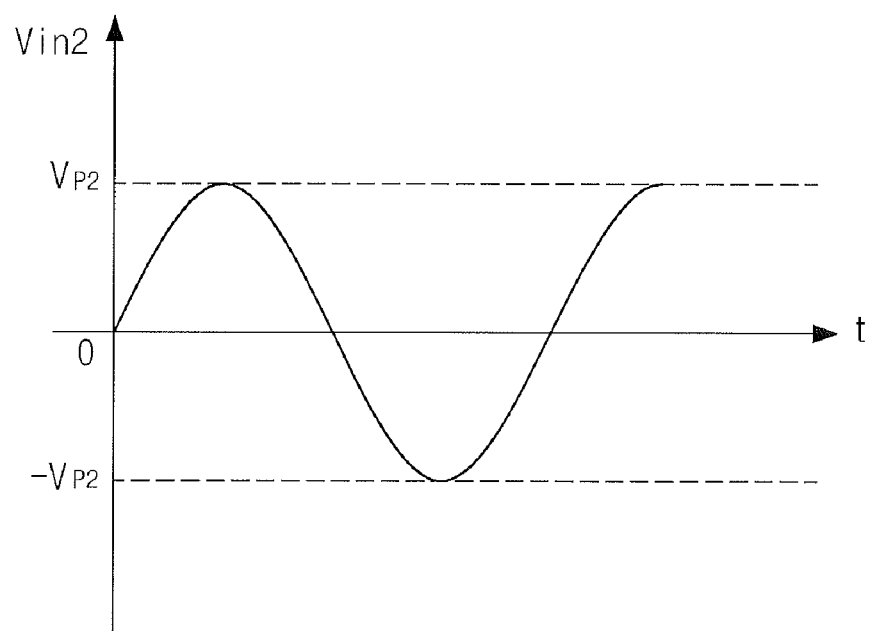
Figure 12C:
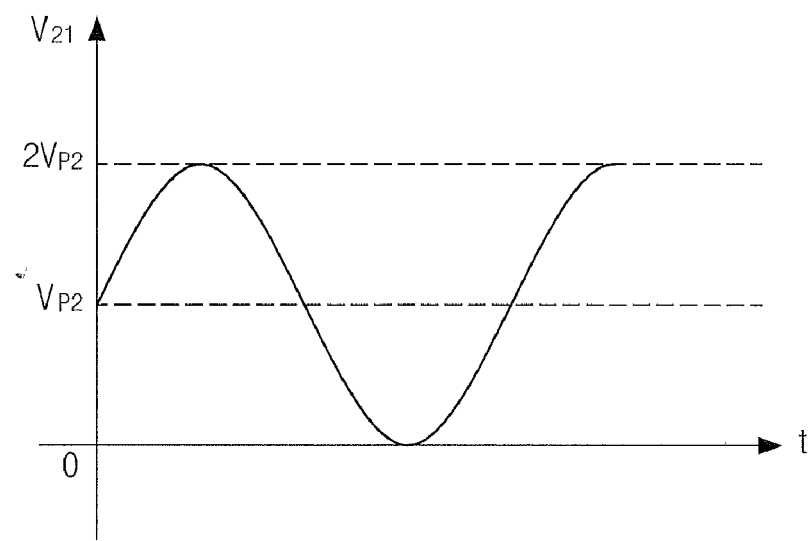
Figure 12D:
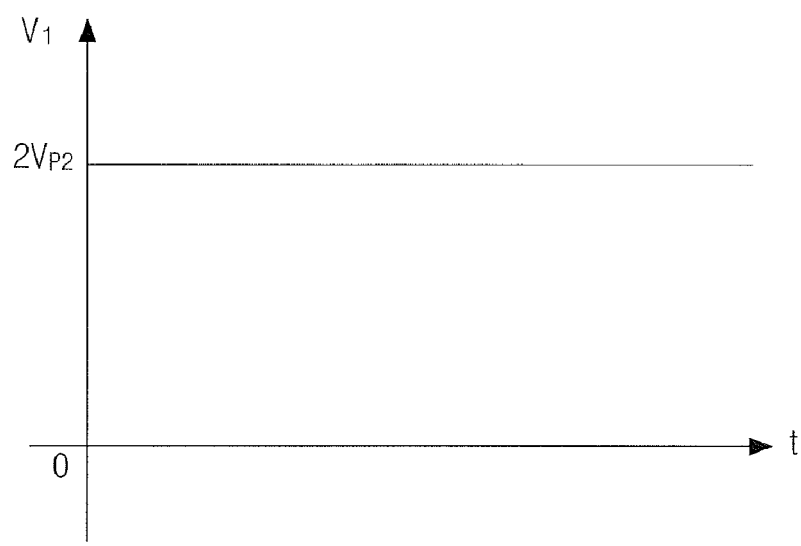

FIG. 12a is a circuit diagram illustrating a portion 'B' of the second voltage rectifier 112 shown in FIG. 10 or in FIG. 13. FIG. 12b illustrates an input waveform of the radio signal received through the second antenna 12. FIG. 12c illustrates an output waveform of a B1 partial circuit (hereinafter, B1 circuit) shown in FIG. 12a. FIG. 12d illustrates an output waveform of a B2 partial circuit (hereinafter, B2 circuit) shown in FIG. 12a.

Referring to FIG. 12b, an input radio signal Vin1 has a sine wave varying in the range of −Vp1 to Vp1. The input radio signal can be any waveform such as those including a sine wave, but a triangle wave, a square wave, or a step wave.

The input radio signal becomes an input to the B1 circuit. In the B1 circuit, current flows when the NMOS transistor N21A is turned on while current does not flow when the NMOS transistor N21A is turned off. That is, only when the input radio signal has a negative voltage, the NMOS transistor N21A is turned on such that electric charges are accumulated in a capacitor CP21. As a result, voltage as much as −(−Vp1)=Vp2 is applied to the capacitor CP21. Accordingly, it becomes VCP21=Vp2.

In FIG. 12a, since it becomes Vin2+VCP21=V21, the signal V21 has a waveform which is obtained by shifting Vin2 by VCP21 in parallel in the positive direction of the Y axis. As shown in FIG. 12c, the output signal V21 has a sine wave varying in the range of 0 to 2 Vp2. In this case, the B1 circuit operates as a clamping circuit because the lowest peak voltage of the output signal V21 is clamped to 0 V.

The signal V21 becomes an input to the B2 circuit. In the B2 circuit, current flows when the NMOS transistor N21B is turned on while current does not flow when the NMOS transistor N21B is turned off. That is, only when the input radio signal has a positive voltage, the NMOS transistor N21B is turned on such that electric charges are accumulated in a capacitor CS21.

When the electric charges are accumulated in the capacitor CS21 and a potential difference greater than the peak voltage 2 Vp2 of the input signal V21 is applied across the capacitor CS21, the electric charges of the capacitor CS21 are not discharged because the NMOS transistor N21B is turned off. Accordingly, as shown in FIG. 12d, a DC voltage having the magnitude of 2 Vp2 is maintained substantially constant at node 21. In this case, since the output signal V2 is rectified into a DC voltage having the highest peak voltage of the input signal V21, the B2 circuit operates as a rectification circuit.

Thereafter, the above operation is repeatedly performed by the capacitors CP22, CS22 and the NMOS transistor N22A, N22B. Since the voltage of the node 21 is 2 Vp2, a DC voltage 2 Vp2+2 Vp2=4 Vp2 is maintained substantially constant at node 22.

As described above, as the rectification and boosting process is performed, a DC voltage N*2 Vp1 is maintained substantially constant at node 2N. Accordingly, the power voltage VDD2 is generated, and it becomes VDD2=N*2 Vp2.

Referring back to FIG. 10, the power voltages VDD1 and VDD2 generated by the first voltage rectifier 111 and the second voltage rectifier 112 become an input to the summation unit 130. The summation unit 130 is configured to perform an operation of adding the power voltages VDD1 and VDD2 which are input signals. As a result, a power voltage VDD which is obtained by adding the power voltage VDD1 to the power voltage VDD2 is generated and outputted to the power-on reset unit 150, the clock generation unit 160, and the memory unit 300. The summation unit 130 can be implemented with an op amplifier in various ways.

The RFID tag of the present invention has two antennas coupled to each other in parallel. The cases where the two antennas receive radio signals can be classified into i) a case where only the first antenna 11 receives the radio signal, ii) a case where only the second antenna 12 receives the radio signal, and iii) a case where the first and second antennas receive the radio signals simultaneously.

In the case of i), the power voltage VDD1 is generated from the radio signal received by the first antenna 11 through the above-described rectification and boosting operation, and it becomes VDD=VDD1.

In the case of ii), the power voltage VDD2 is generated from the radio signal received by the second antenna 12 through the above-described rectification and boosting operation, and it becomes VDD=VDD2.

In the case of iii), since the first and second antennas 11 and 12 receive the radio signals simultaneously, the power voltages VDD1 and VDD2 are generated through the above-described rectification and boosting operation, and it becomes VDD=VDD1+VDD2.

FIG. 13 is a circuit diagram illustrating a modulation/demodulation unit 120 according to the third embodiment of the present invention.

Referring to FIG. 13, the radio signals received through the first antenna 11 and the second antenna 12 are respectively inputted to the first demodulator 1211 and the second demodulator 1221. The first demodulator 1211 demodulates the radio signal received from the first antenna 11, detects and outputs a reception signal RX1, which is an operation command signal, from the radio signal. The second demodulator 1221 demodulates the radio signal received from the second antenna 12, detects and outputs a reception signal RX2, which is an operation command signal, from the radio signal.

The logical sum device 140 is configured to logically sum the reception signal RX1 and the reception signal RX2 and generate a reception signal RX. The reception signal RX is inputted to the digital unit 200.

The logical sum device 140 can be implemented with an OR gate. That is, the logical sum device 140 outputs the reception signal RX of high level although any one of the reception signals RX1 and RX2 has a high level.

Figure 14:
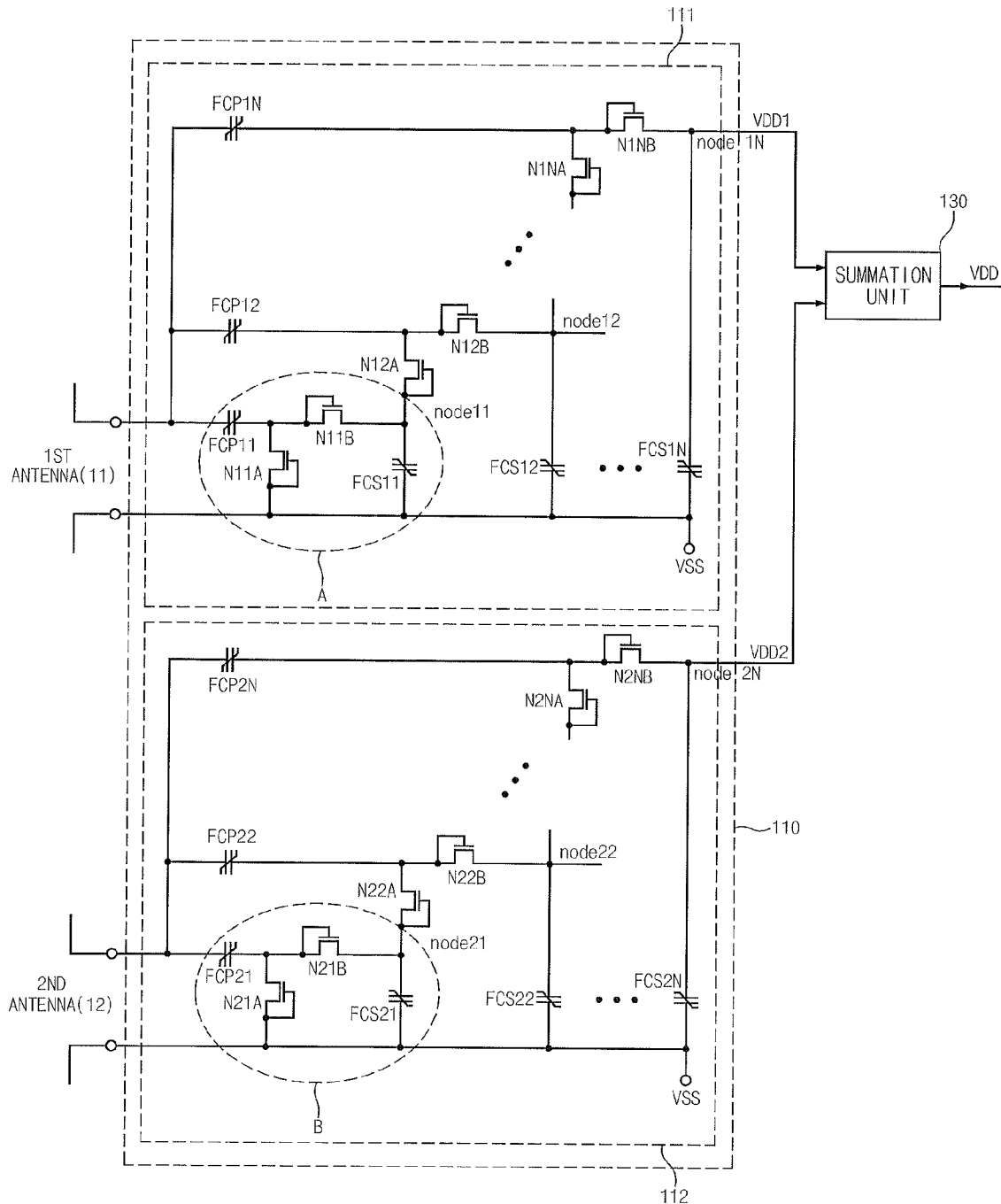
FIG. 14 is a detailed circuit diagram illustrating a voltage rectification unit and a summation unit according to a fourth embodiment of the present invention.

FIG. 14 is a detailed circuit diagram illustrating a voltage rectification unit and a summation unit according to a third embodiment of the present invention;

The voltage rectification unit 110 according to the present embodiment includes a first voltage rectifier 111 and a second voltage rectifier 112. The first voltage rectifier 111 includes a plurality of ferroelectric capacitors FCS11 to FCS1N, FCP11 to FCP1N and a plurality of NMOS transistors N11A, N11B to N1NA, N1NB. The second voltage rectifier 112 includes a plurality of ferroelectric capacitors FCS21 to FCS2N, FCP21 to FCP2N and a plurality of NMOS transistors N21A, N21B to N2NA, N2NB.

The plurality of NMOS transistors N11A, N11B to N1NA, N1NB and the plurality of NMOS transistors N21A, N21B to N2NA, N2NB are used as rectification components. The NMOS transistors can be implemented using PN-type or NP-type NMOS transistors.

The first antenna 11 performs NF RFID communication carried out in accordance with Faraday's law of induction. The NF RFID communication is a communication method using a low frequency domain of 1 MHz or less. This communication method preferably operates in the distance of 50 cm or less.

The second antenna 12 performs FF RFID communication carried out in accordance with the principle of electromagnetic energy. The FF RFID communication is a communication method using a high frequency domain of 100 MHz or more. The communication method preferably operates in the distance of 50 cm or more.

According to the present invention, radio signals can be transceived irrespective of the distance between the RF reader and the RF tag because the radio signals are received from the first antenna 11 and the second antenna 12.

The radio signals received through the first antenna 11 and the second antenna 12 are inputted to the voltage rectification unit 110. In detail, the radio signal received from the first antenna 11 is rectified and boosted by the first voltage rectifier 111, and the radio signal received from the second antenna 12 is rectified and boosted by the second voltage rectifier 112.

Referring to FIG. 14, the first voltage rectifier 111 includes the plurality of ferroelectric capacitors FCP11 to FCP1N, FCS11 to FCS1N and the plurality of NMOS transistors N11A, N11B to N1NA, N1NB. The second voltage rectifier 112 includes the plurality of ferroelectric capacitors FCP21 to FCP2N, FCS21 to FCS2N and the plurality of NMOS transistors N21A, N21B to N2NA, N2NB.

FIGS. 15a to 15d are diagrams illustrating the operation of the first voltage rectifier 111 according to the fourth embodiment of the present invention.

Figure 15A:
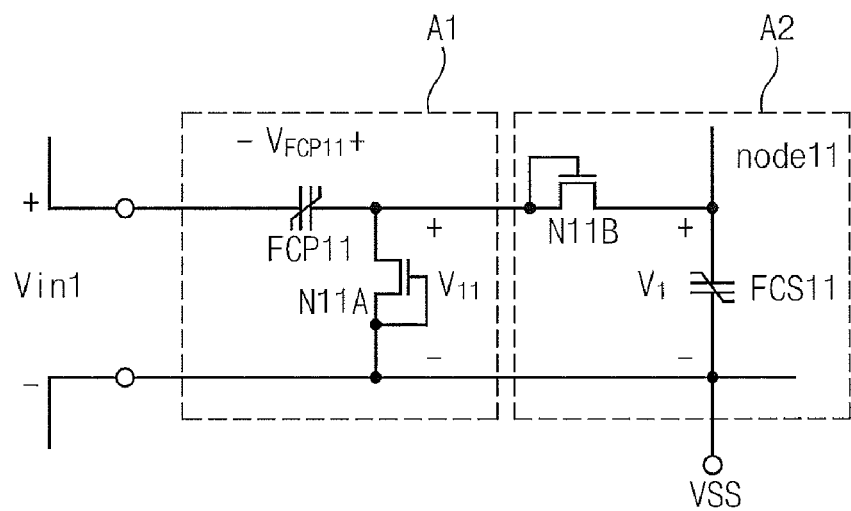
FIGS. 15a to 15d are diagrams illustrating the operation of a first voltage rectifier according to the fourth embodiment of the present invention.
Figure 15B:
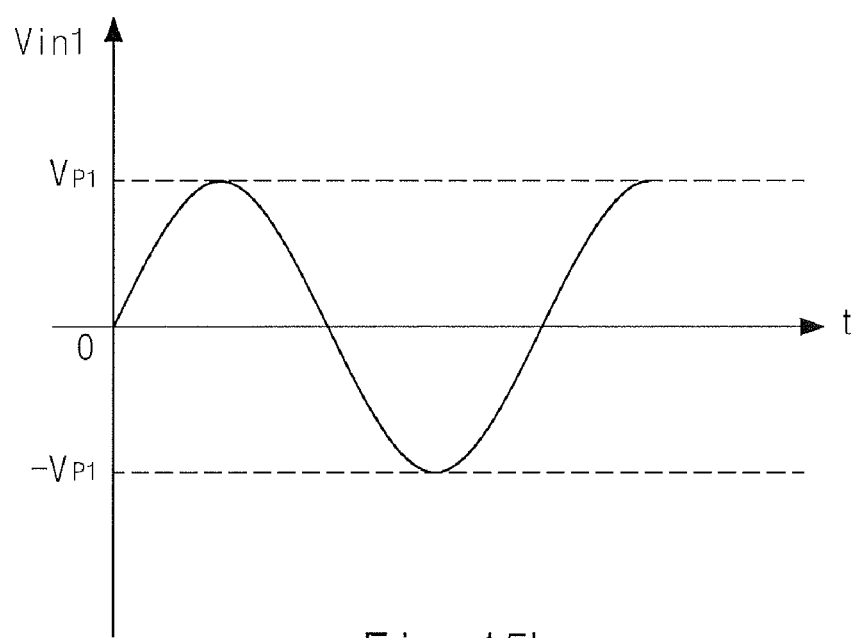
Figure 15C:
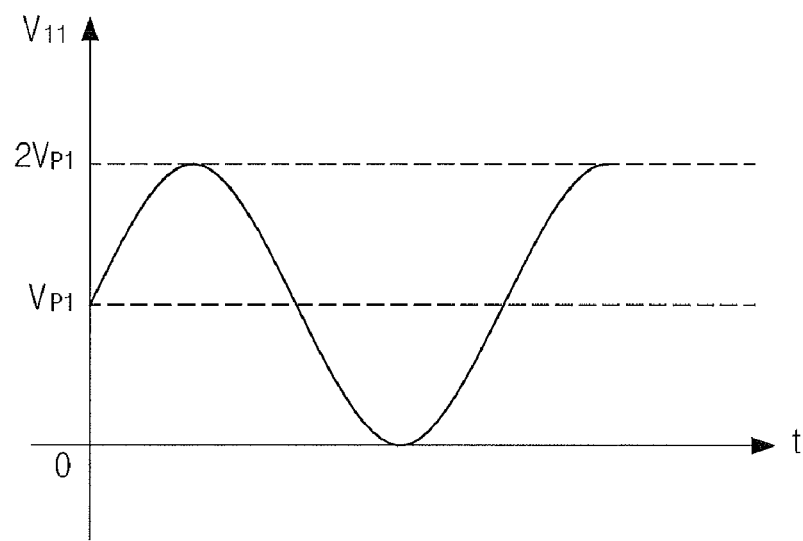
Figure 15D:
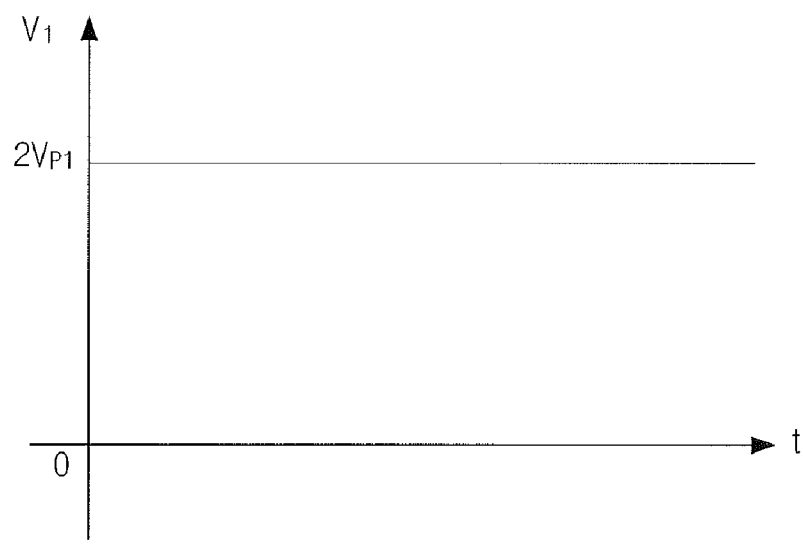
Figure 17:
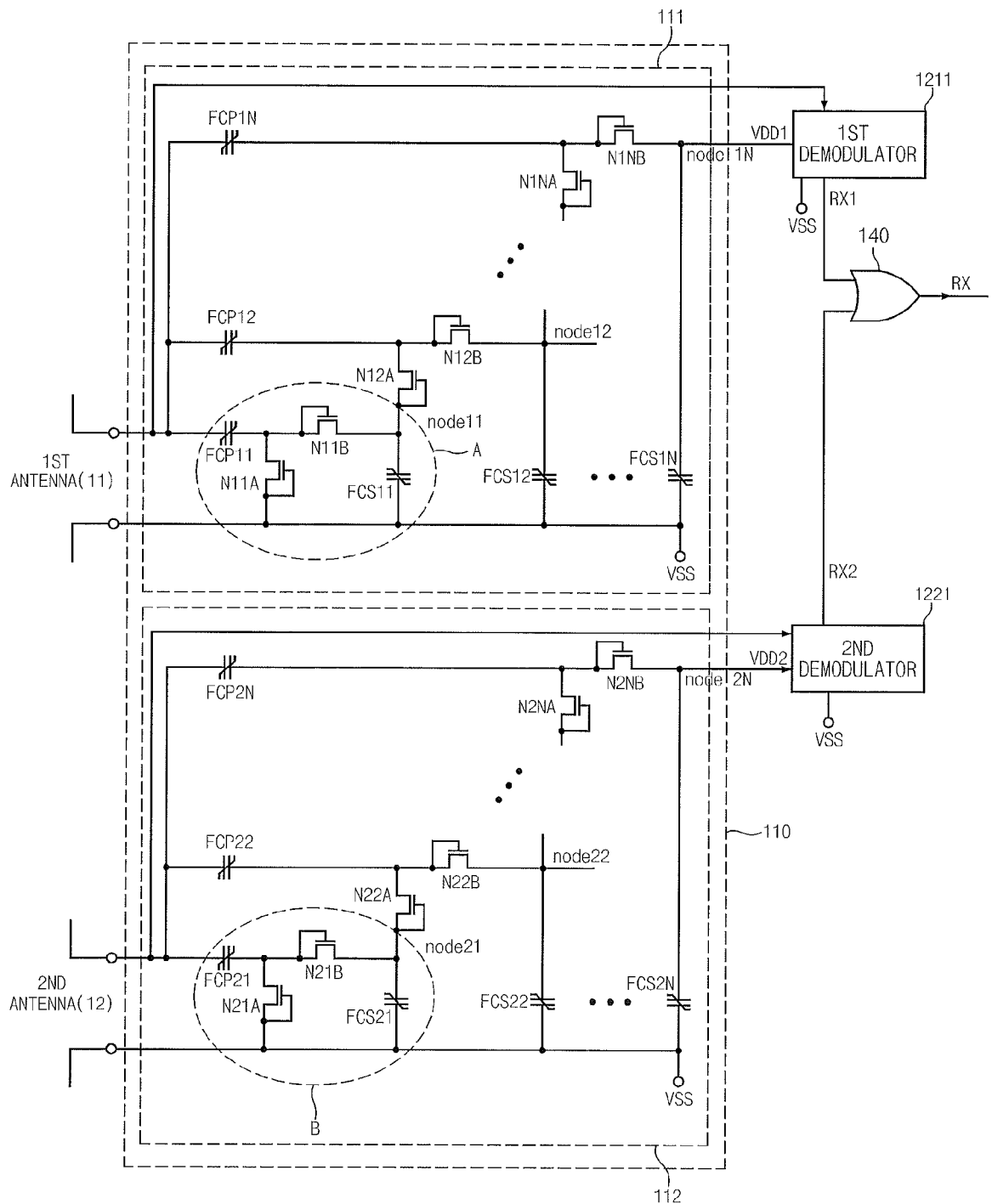
FIG. 17 is a circuit diagram illustrating a modulation/demodulation unit according to the fourth embodiment of the present invention.

FIG. 15a is a circuit diagram illustrating a portion 'A' of the first voltage rectifier 111 shown in FIG. 14 or in FIG. 17. FIG. 15b illustrates an input waveform of the radio signal received through the first antenna 11. FIG. 15c illustrates an output waveform of a A1 partial circuit (hereinafter, A1 circuit) shown in FIG. 15a. FIG. 15d illustrates an output waveform of a A2 partial circuit (hereinafter, A2 circuit) shown in FIG. 15a.

Referring to FIG. 15b, an input radio signal has a sine wave varying in the range of $-Vp1$ to $Vp1$. The input radio signal can be any waveform such as those including a sine wave, but a triangle wave, a square wave, or a step wave.

The input radio signal becomes an input to the A1 circuit. In the A1 circuit, current flows when the NMOS transistor N11A is turned on while current does not flow when the NMOS transistor N11A is turned off. That is, only when the input radio signal has a negative voltage, the NMOS transistor N11A is turned on such that electric charges are accumulated in a ferroelectric capacitor FCP11. As a result, voltage as much as $-(-Vp1)=Vp1$ is applied to the ferroelectric capacitor FCP11. Accordingly, it becomes VCP11=Vp1.

In FIG. 15a, since it becomes Vin1+VCP11=V11, the signal V11 has a waveform which is obtained by shifting Vin1 by VCP11 in parallel in the positive direction of the Y axis. As shown in FIG. 15c, the signal V11 has a sine wave varying in the range of 0 to $2Vp1$. In this case, the A1 circuit operates as a clamping circuit because the lowest peak voltage of the output signal V11 is clamped to 0 V.

The signal V11 becomes an input to the A2 circuit. In the A2 circuit, current flows when the NMOS transistor N11B is turned on while current does not flow when the NMOS transistor N11B is turned off. That is, only when the input radio signal has a positive voltage, the NMOS transistor N11B is turned on such that electric charges are accumulated in a ferroelectric capacitor FCS11.

When the electric charges are accumulated in the ferroelectric capacitor FCS11 and a potential difference greater than the peak voltage $2Vp1$ of the input signal V11 is applied across the ferroelectric capacitor FCS11, the electric charges of the ferroelectric capacitor FCS11 are not discharged because the NMOS transistor N21B is turned off. Accordingly, as shown in FIG. 15d, a DC voltage having the magnitude of $2Vp1$ is maintained substantially constant at node 11. In this case, since the output signal V1 is rectified into a DC voltage having the highest peak voltage of the input signal V11, the A2 circuit operates as a rectification circuit.

Thereafter, the above operation is repeatedly performed by the ferroelectric capacitor FCP12, FCS12 and the NMOS transistor N12A, N12B. Since the voltage of the node 11 is $2Vp1$, a DC voltage $2Vp1+2Vp1=4Vp1$ is maintained substantially constant at node 12.

As described above, as the rectification and boosting process is performed, a DC voltage $N*2Vp1$ is maintained substantially constant at node 1N. Accordingly, the power voltage VDD1 is generated, and it becomes VDD1=$N*2Vp1$.

Meanwhile, the present invention includes two antennas configured to receive different signals. Accordingly, the process of rectifying and boosting a radio signal received through the first antenna 11 can be identically applied to a case where a radio signal received through the second antenna 12 is rectified and boosted.

FIGS. 16a to 16d are diagrams illustrating the operation of the second voltage rectifier 112 according to the fourth embodiment of the present invention.

Figure 16A:
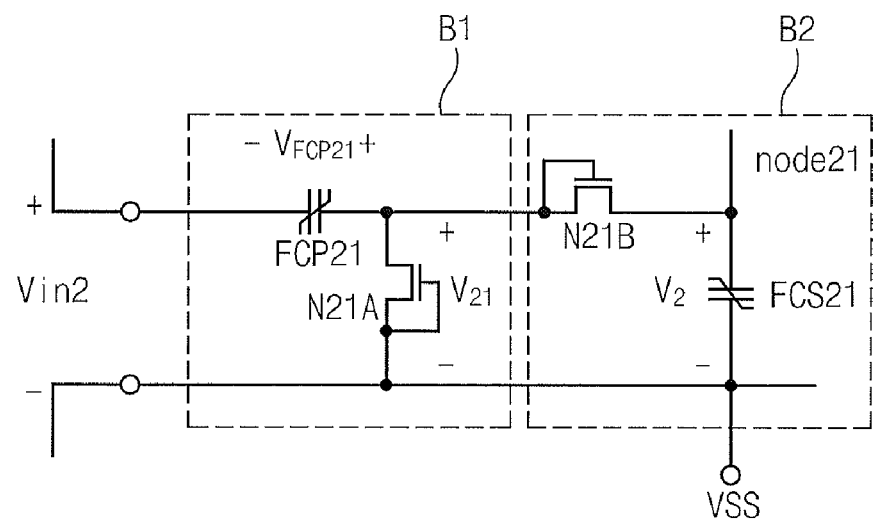
FIGS. 16a to 16d are diagrams illustrating the operation of a second voltage rectifier according to the fourth embodiment of the present invention.
Figure 16B:
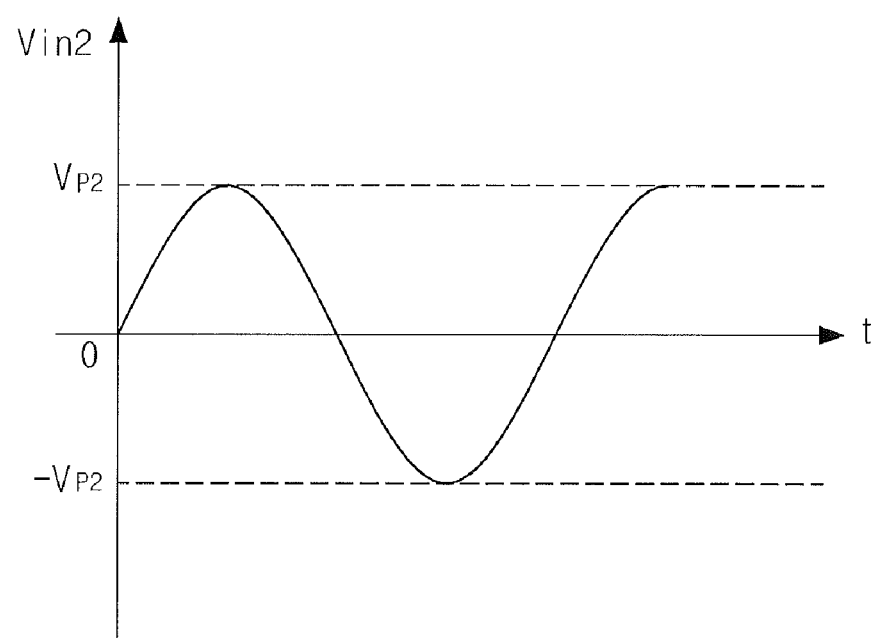
Figure 16C:
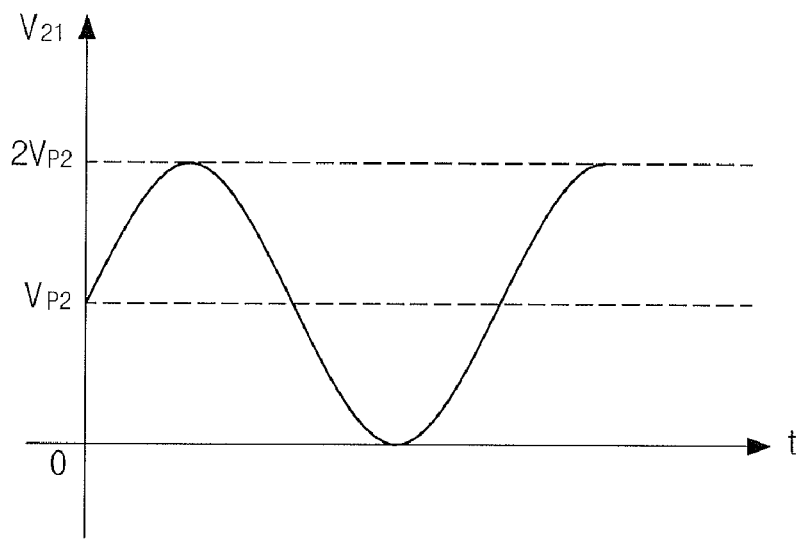
Figure 16D:
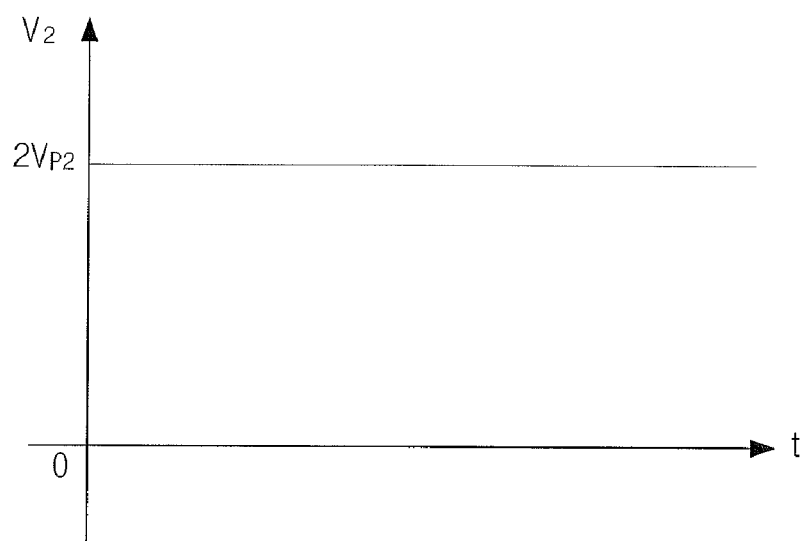

FIG. 16a is a circuit diagram illustrating a portion 'B' of the second voltage rectifier 112 shown in FIG. 14 or in FIG. 17. FIG. 16b illustrates an input waveform of the radio signal received through the second antenna 12. FIG. 16c illustrates an output waveform of a B1 partial circuit (hereinafter referred to as a 'B1 circuit') shown in FIG. 16a. FIG. 16d illustrates the output waveform of a B2 partial circuit (hereinafter referred to as a 'B2 circuit') shown in FIG. 16a.

Referring to FIG. 16b, an input radio signal Vin2 has a sine wave varying in the range of $-Vp2$ to $Vp2$. The input radio signal may have any waveform such as those including a sine wave, but a triangle wave, a square wave, or a step wave.

The input radio signal becomes an input to the B1 circuit. In the B1 circuit, current flows when a NMOS transistor N21A is turned on while current does not flow when the NMOS transistor N21A is turned off. That is, only when the input radio signal has a negative voltage, the NMOS transistor N21A is turned on such that electric charges are accumulated in a ferroelectric capacitor FCP21. As a result, the voltage as much as $-(-Vp2)=Vp2$ is applied to ferroelectric capacitor FCP21. Accordingly, it becomes VFCP21=Vp2.

In FIG. 16a, since it becomes Vin2+VFCP21=V21, the signal V21 has a waveform which is obtained by shifting Vin2 by VFCP21 in parallel in the positive direction of the Y axis. As shown in FIG. 16c, the signal V21 has a sine wave varying in the range of 0 to $2Vp2$. In this case, the B1 circuit operates as a clamping circuit because the lowest peak voltage of the output signal V21 is clamped to 0 V.

The signal V21 becomes an input to the B2 circuit. In the B2 circuit, current flows when a NMOS transistor N21B is turned on while current does not flow when the NMOS transistor N21B is turned off. That is, only when the input radio signal has a positive voltage, the NMOS transistor N21B is turned on such that electric charges are accumulated in a ferroelectric capacitor FCS21.

When the electric charges are accumulated in the ferroelectric capacitor FCS21 and a potential difference greater than the peak voltage 2 Vp2 of the input signal V21 is applied across ferroelectric capacitor FCS21, the electric charges of ferroelectric capacitor FCS21 are not discharged because the NMOS transistor N21B is turned off. Accordingly, as shown in FIG. 16d, a DC voltage having the magnitude of 2 Vp2 is maintained substantially constant at node 21. In this case, since the output signal V2 is rectified into a DC voltage having the highest peak voltage of the input signal V21, the A2 circuit operates as a rectification circuit.

Thereafter, the above operation is repeatedly performed by the ferroelectric capacitor FCP22, FCS22 and the NMOS transistors N22A, N22B. Since the voltage of the node 21 is 2 Vp2, a DC voltage 2 Vp2+2 Vp2=4 Vp2 is maintained substantially constant at node 22.

As described above, as the rectification and boosting process is performed, a DC voltage N*2 Vp2 is maintained substantially constant at node 2N. Accordingly, the power voltage VDD2 is generated, and it becomes VDD2=N*2 Vp2.

Referring back to FIG. 14, the power voltages VDD1 and VDD2 generated by the first voltage rectifier 111 and the second voltage rectifier 112 become an input to the summation unit 130. The summation unit 130 is configured to perform an operation of adding the power voltages VDD1 and VDD2 which are input signals. As a result, a power voltage VDD which is obtained by adding the power voltage VDD1 to the power voltage VDD2 is generated and outputted to the power-on reset unit 150, the clock generation unit 160, and the memory unit 300. The summation unit 130 can be implemented with an op amplifier in various ways.

The RFID tag of the present invention has two antennas coupled to each other in parallel. The cases where the two antennas receive radio signals can be classified into i) a case where only the first antenna 11 receives the radio signal, ii) a case where only the second antenna 12 receives the radio signal, and iii) a case where the first and second antennas receive the radio signals simultaneously.

In the case of i), the power voltage VDD1 is generated from the radio signal received by the first antenna 11 through the above-described rectification and boosting operation, and it becomes VDD=VDD1.

In the case of ii), the power voltage VDD2 is generated from the radio signal received by the second antenna 12 through the above-described rectification and boosting operation, and it becomes VDD=VDD2.

In the case of iii), since the first and second antennas 11 and 12 receive the radio signals simultaneously, the power voltages VDD1 and VDD2 are generated through the above-described rectification and boosting operation, and it becomes VDD=VDD1+VDD2.

FIG. 17 is a circuit diagram illustrating a modulation/demodulation unit 120 according to the fourth embodiment of the present invention.

Referring to FIG. 17, the radio signals received through the first antenna 11 and the second antenna 12 are respectively inputted to the first demodulator 1211 and the second demodulator 1221. The first demodulator 1211 demodulates the radio signal received from the first antenna 11, detects and outputs a reception signal RX1, which is an operation command signal, from the radio signal. The second demodulator 1221 demodulates the radio signal received from the second antenna 12, detects and outputs a reception signal RX2, which is an operation command signal, from the radio signal.

The logical sum device 140 is configured to logically sum the reception signal RX1 and the reception signal RX2 and generate a reception signal RX. The reception signal RX is inputted to the digital unit 200.

The logical sum device 140 can be implemented with an OR gate. That is, the logical sum device 140 outputs the reception signal RX of high level although any one of the reception signals RX1 and RX2 has a high level.

Figure 18:
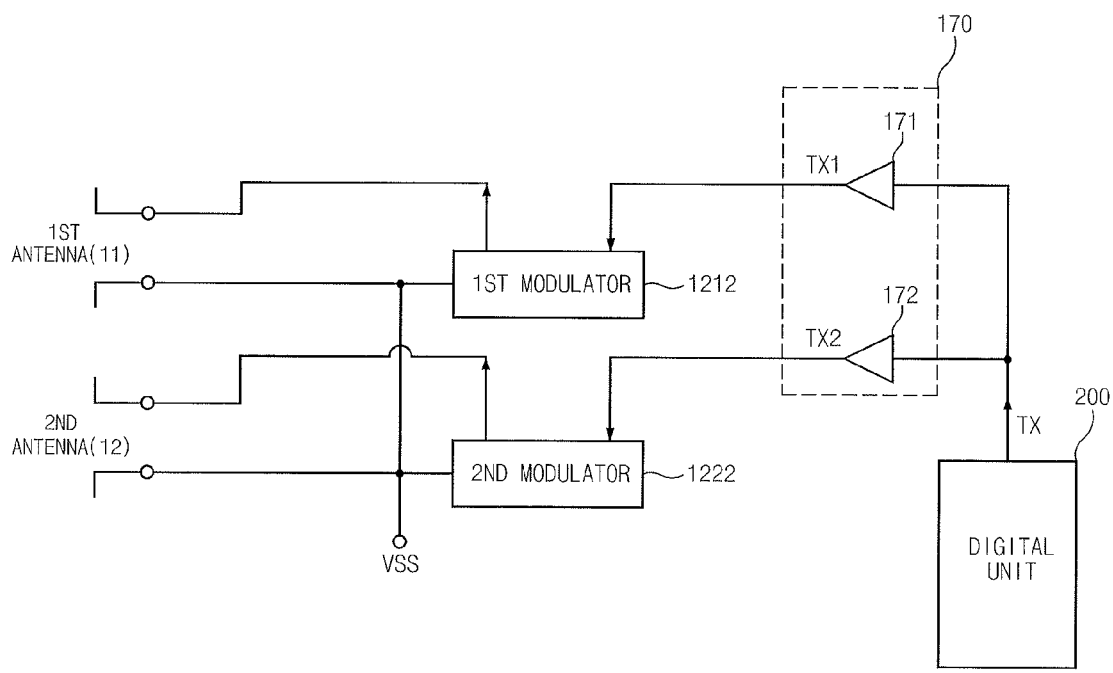
FIG. 18 is a circuit diagram illustrating a driving unit and modulation/demodulation unit according to the present invention.

FIG. 18 is a circuit diagram of the driving unit 170 and the modulation/demodulation unit 120 according to the present invention.

Referring to FIG. 18, the transmission signal TX outputted from the digital unit 200 is inputted to the driving unit 170. The driving unit 170 includes the first driver 171 and the second driver 172. The first driver 171 generates the first transmission signal TX1 in response to the input transmission signal TX. The second driver 172 generates the second transmission signal TX2 in response to the input transmission signal TX.

The first transmission signal TX1 is inputted to the first modulator 1212, and then, is modulated into a radio signal having a frequency of a first bandwidth. The second transmission signal TX2 is inputted to the second modulator 1222, and then, is modulated into a radio signal having a frequency of a second bandwidth. The modulated signals are sent to a RFID reader through the first antenna 11 and the second antenna 12 respectively.

The above embodiments of the present invention are illustrative and not limitative. Various alternatives and equivalents are possible. The invention is not limited by the type of deposition, etching polishing, and patterning steps describe herein. Nor is the invention limited to any specific type of semiconductor device. Other additions, subtractions, or modifications are obvious in view of the present disclosure and are intended to fall within the scope of the appended claims.

What is claimed is:

1. A radio frequency identification (RFID) tag comprising:
   an antenna unit configured to communicate within a first bandwidth and/or within a second bandwidth;
   a voltage rectification unit configured to generate a plurality of DC power voltage impulses respectively corresponding to a plurality of radio signals from within the first and/or second bandwidths received at the antenna unit, the voltage rectification unit configured to rectify and to boost the received radio signals into the DC power voltage impulses; and
   a summation unit configured to generate a total power voltage impulse by summing the one or more DC power voltage impulses,
   wherein the antenna unit comprises:
   a first antenna configured to communicate within the first bandwidth; and
   a second antenna configured to communicate within the second bandwidth.

2. The RFID tag according to claim 1, wherein the voltage rectification unit comprises:
   a first rectifier coupled to the first antenna; and
   a second rectifier coupled to the second antenna.

3. The RFID tag according to claim 2, wherein each rectifier comprises:
   a clamping circuit coupled to one corresponding antenna unit, each clamping circuit configured to clamp and to output at least one of the radio signals from one corresponding antenna unit; and
   a rectification circuit coupled to the clamping circuit, each rectification circuit configured to rectify the signals outputted from a corresponding clamping circuit and configured to generate the DC power voltage impulses.

4. The RFID tag according to claim 3, wherein the rectification circuit of each rectifier comprises:
- a plurality of rectification devices configured to rectify signals outputted from corresponding clamping circuits; and
- a plurality of electric charge storage devices configured to store electric charges that pass through the rectification devices.

5. The RFID tag according to claim 3, wherein the clamping circuit of each rectifier comprises:
- a plurality of clamping devices coupled to a corresponding antenna, the clamping devices configured to store electric charges from the radio signals received from the corresponding antenna; and
- a plurality of rectification devices coupled to the corresponding antenna and coupled to the clamping devices, the rectification devices configured to clamp signals from the clamping devices and from the corresponding antenna.

6. The RFID tag according to claim 1, wherein the first bandwidth is within a low frequency domain of about 1 MHz or less, and the second bandwidth is within a high frequency domain of about 100 MHz or more.

7. The RFID tag according to claim 4, wherein the rectification devices comprise Schottky diodes.

8. The RFID tag according to claim 4, wherein the rectification devices comprise a NMOS transistors.

9. The RFID tag according to claim 7, wherein the Schottky diodes comprise PN-type Schottky diodes or NP-type Schottky diodes.

10. The RFID tag according to claim 5, wherein the electric charge storage devices comprise capacitors.

11. The RFID tag according to claim 4, wherein the electric charge storage devices comprise a ferroelectric capacitors.

12. The RFID tag according to claim 8, wherein the electric charge storage devices are coupled to a N-type region or to a P-type region of the Schottky diodes.

13. The RFID tag according to claim 8, wherein the electric charge storage devices are coupled to a source terminal or to a drain terminal of the NMOS transistor.

14. The RFID tag according to claim 1, wherein the voltage rectification unit having a clamping circuit comprising:
- a plurality of clamping devices coupled to a corresponding antenna, the clamping devices configured to store electric charges from the radio signals received from the corresponding antenna; and
- a plurality of rectification devices coupled to the corresponding antenna and coupled to the clamping devices, the rectification devices configured to clamp signals from the clamping devices and from the corresponding antenna.

15. The RFID tag according to claim 14, wherein clamping devices comprise capacitors.

16. The RFID tag according to claim 14, wherein the clamping devices comprise ferroelectric capacitors.

17. The RFID tag according to claim 14, wherein the rectification devices comprise Schottky diodes.

18. The RFID tag according to claim 14, wherein the rectification devices comprise NMOS transistors.

19. The RFID tag according to claim 17, wherein the Schottky diodes comprise a PN-type Schottky diode or a NP-type Schottky diode.

20. The RFID tag according to claim 19, wherein the clamping devices are coupled to either an N-type region or a P-type region of the Schottky diodes.

21. The RFID tag according to claim 18, wherein the clamping devices are coupled to either a source terminal or a drain terminal of the NMOS transistors.

22. The RFID tag according to claim 1, wherein the first antenna is configured to perform Near Field (NF) communication, and the second antenna is configured to perform Far Field (FF) communication.

23. The RFID tag according to claim 1, further comprising a demodulation circuit unit configured to detect and to output one or more operation command signals corresponding to the radio signals.

24. The RFID tag according to claim 23, wherein the demodulation circuit unit comprises:
- a first demodulation circuit configured to detect a first operation command signal in response to a first radio signal received through a first antenna of the antenna unit; and
- a second demodulation circuit configured to detect a second operation command signal in response to a second radio signal received through a second antenna of the antenna unit.

25. The RFID tag according to claim 23, further comprising a logical sum device configured to logically sum the one or more of the operation command signals and to generate a total operation command signal.

26. The RFID tag according to claim 25, further comprising a digital unit configured to perform a control operation in response to the total operation command signal and configured to generate a transmission signal.

27. The RFID tag according to claim 26, further comprising a driving unit configured, in response to the transmission signal, to operate a first transmission signal for transmitting within the first bandwidth and to operate a second transmission signal for transmitting within the second bandwidth.

28. The RFID tag according to claim 27, further comprising a modulation circuit unit configured to modulate the first transmission signal and the second transmission signal, and to transmit the modulated signals through the antenna unit.

* * * * *